United States Patent
Kolesar et al.

(10) Patent No.: US 8,109,523 B2
(45) Date of Patent: Feb. 7, 2012

(54) SKIBOB AND METHOD FOR RIDING A CHAIRLIFT

(76) Inventors: Robert Kolesar, Bozeman, MT (US); William J Ritter, Bozeman, MT (US)

( * ) Notice: Subject to any disclaimer, the term of this patent is extended or adjusted under 35 U.S.C. 154(b) by 514 days.

(21) Appl. No.: 12/277,311

(22) Filed: Nov. 25, 2008

(65) Prior Publication Data

US 2009/0140503 A1 Jun. 4, 2009

Related U.S. Application Data

(60) Provisional application No. 61/004,808, filed on Dec. 1, 2007.

(51) Int. Cl.
 *B62B 13/00* (2006.01)
 *B62B 17/04* (2006.01)
(52) U.S. Cl. ... 280/21.1; 280/16; 280/28.14; 280/14.28; 280/25; 280/14.25
(58) Field of Classification Search ............ 280/16, 280/845, 28.14, 21.1, 14, 809, 816, 14.27, 280/14.28, 20, 25, 23.1, 12.1, 22.1, 22, 12.12, 280/14.25; 180/180, 182, 193
See application file for complete search history.

(56) References Cited

U.S. PATENT DOCUMENTS

| | | |
|---|---|---|
| 473,434 A | 4/1892 | Stevens |
| 485,345 A | 11/1892 | Gibson |
| 566,438 A | 8/1896 | Anderson |
| 1,209,398 A | 12/1916 | Converse |
| 3,588,138 A | 6/1971 | Cerny |
| 3,783,706 A | 1/1974 | Ogawa |
| 3,917,301 A | 11/1975 | Fabris |
| 4,097,055 A | 6/1978 | Laycraft |
| 4,632,408 A | 12/1986 | Olpp |
| 5,738,361 A | 4/1998 | Landucci |
| 5,863,051 A | 1/1999 | Brenter |
| 6,019,380 A | 2/2000 | Goodman |
| 6,036,202 A | 3/2000 | LaCome |
| 6,179,305 B1 | 1/2001 | Capozzi |
| 6,626,441 B1 * | 9/2003 | Hanson ............... 280/7.14 |
| 6,708,791 B2 * | 3/2004 | Alexander ............ 180/182 |
| 6,736,414 B2 | 5/2004 | Farrally-Plourde |
| 6,783,134 B2 * | 8/2004 | Geary .................. 280/21.1 |
| 7,547,023 B2 | 6/2009 | Yau |
| 2003/0222419 A1 * | 12/2003 | Geary .................. 280/21.1 |
| 2006/0169510 A1 * | 8/2006 | Visscher ............... 180/193 |
| 2006/0197294 A1 | 9/2006 | Yau |
| 2007/0194541 A1 * | 8/2007 | Maldeghem ........... 280/16 |

* cited by examiner

*Primary Examiner* — John R Olszewski
(74) *Attorney, Agent, or Firm* — K. Karel Lambert; Lambert Patent Services, LLC

(57) ABSTRACT

Skibobs are disclosed having features for conveying the skibob with rider on a moving chairlift while the rider remains mounted on the seat of the skibob. The frame and suspension are configured for elevating the underside of the skibob seat above the level of the chairlift bench during loading, so that the chairlift bench, while moving forward from behind the rider, can pick up the skibob, rider and all, and carry the mounted rider up the ski slope without falling. As the undercarriage of the skibob is lifted off the snow, the rider is deposited on the chairlift bench so that the seat of the skibob is secured in place by the weight of the rider on the seat. During offloading, the skibob is nonetheless readily disengaged from the chairlift bench with an active boost from the suspension and optional spring-loaded seat as the undercarriage contacts the offloading platform, permitting the rider to ski away from the chairlift without dismounting the skibob, thus improving ease of use for riders with limits in physical capacity. These and other features of the invention are a benefit to disabled persons in gaining access to the ski slopes.

11 Claims, 21 Drawing Sheets

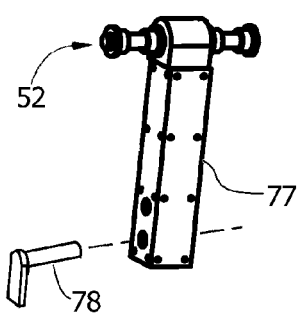
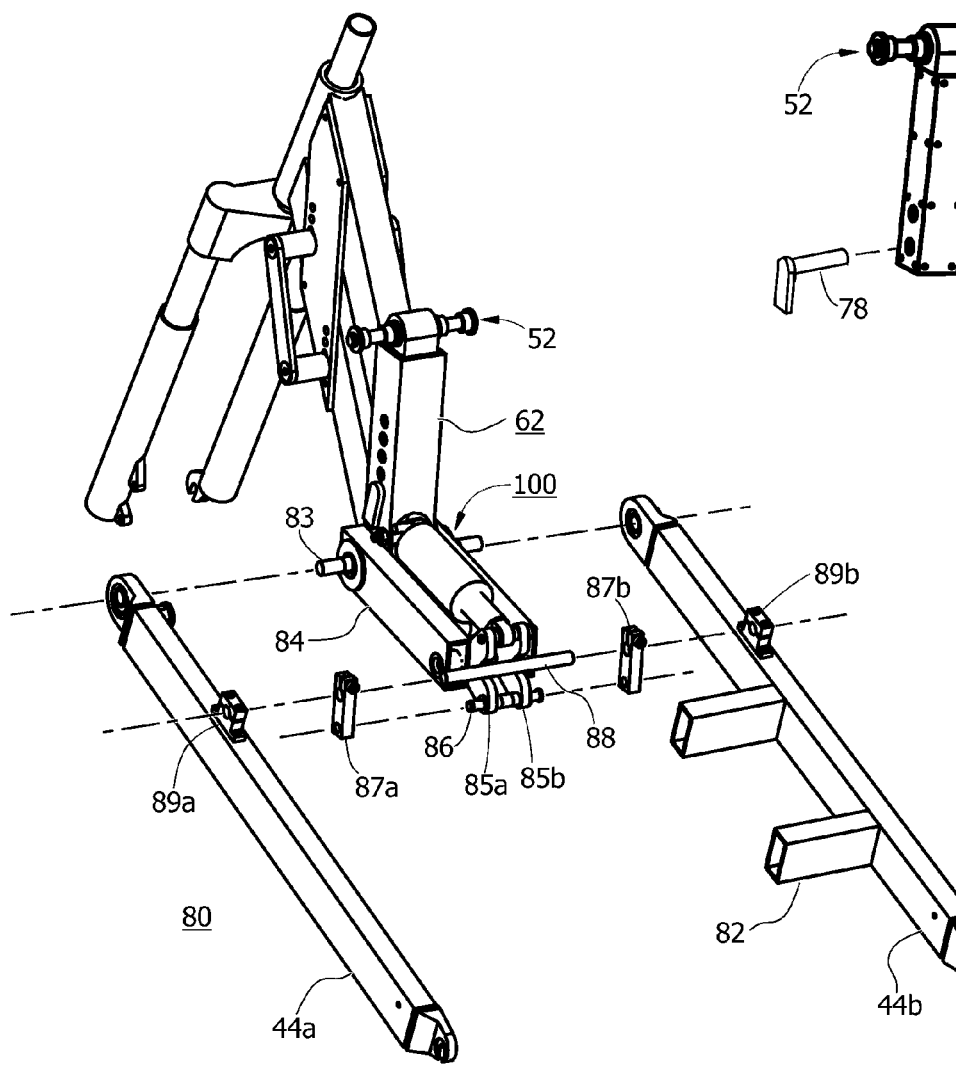
Fig. 7
Fig. 8

REPRESENTATIVE FORCE-TRAVEL CURVE FOR REAR SUSPENSION WITH TENSIONED COUPLER, CHEBYSHEV LINKAGE, AND PROGRESSIVE SHOCK

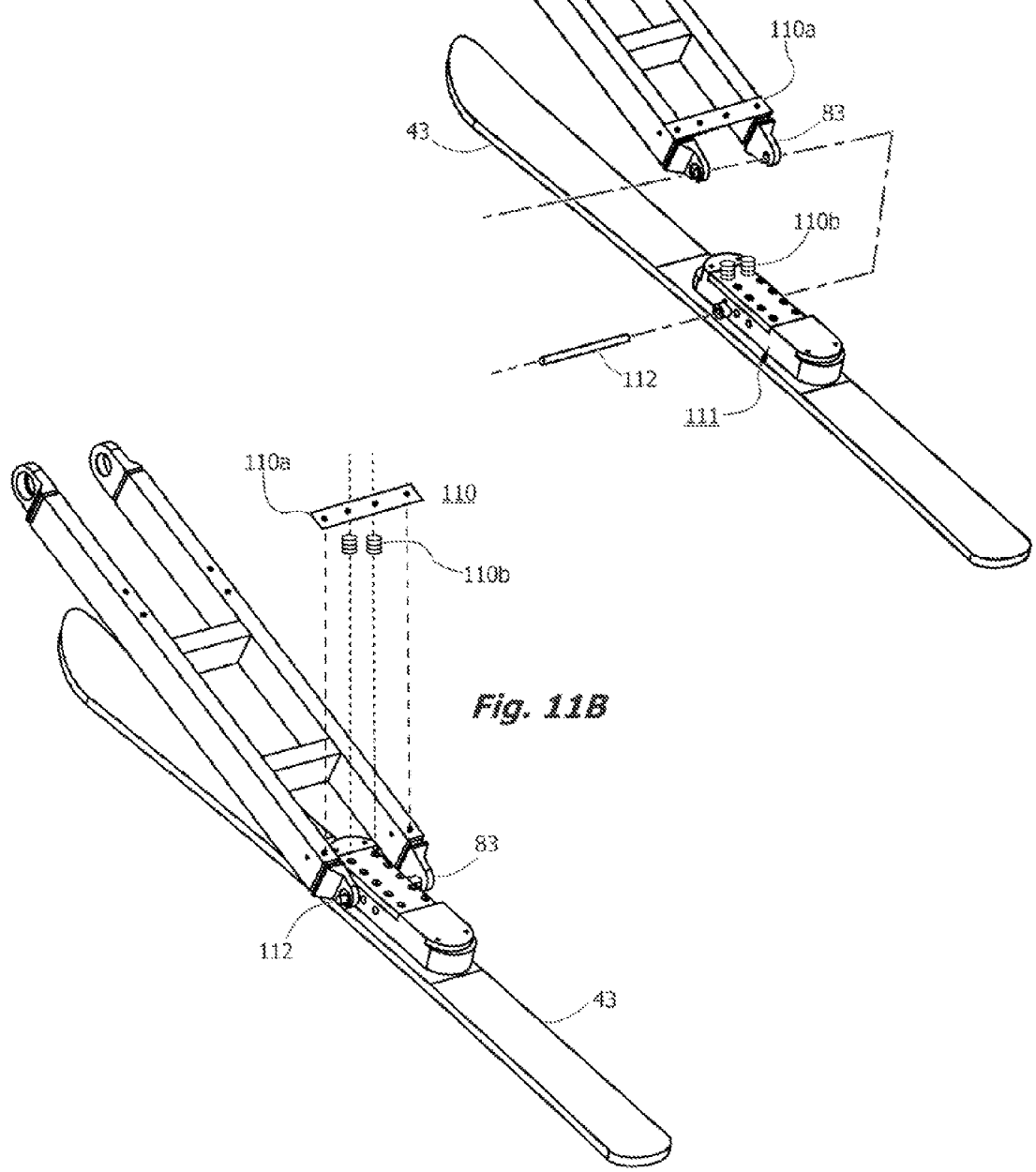

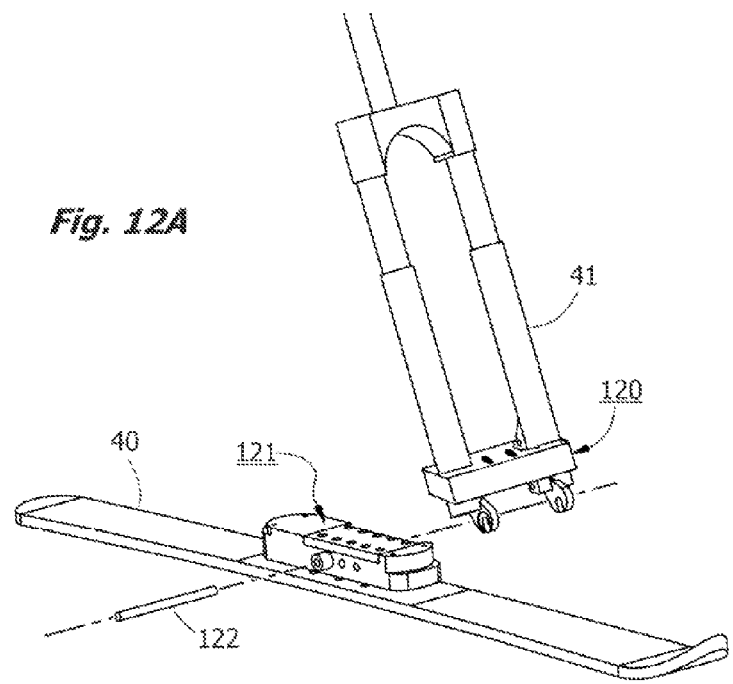
*Fig. 12A*
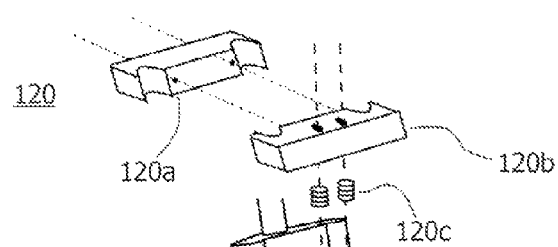
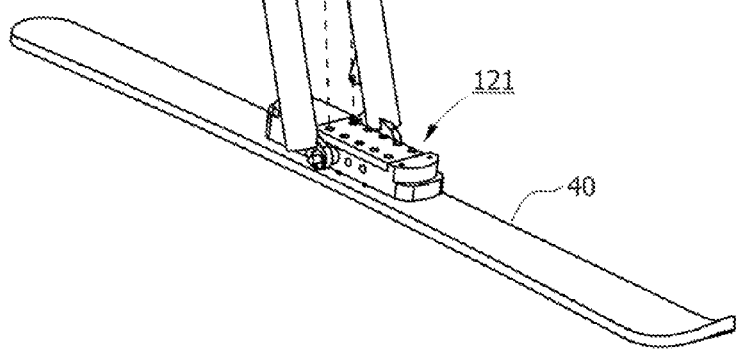
*Fig. 12B*

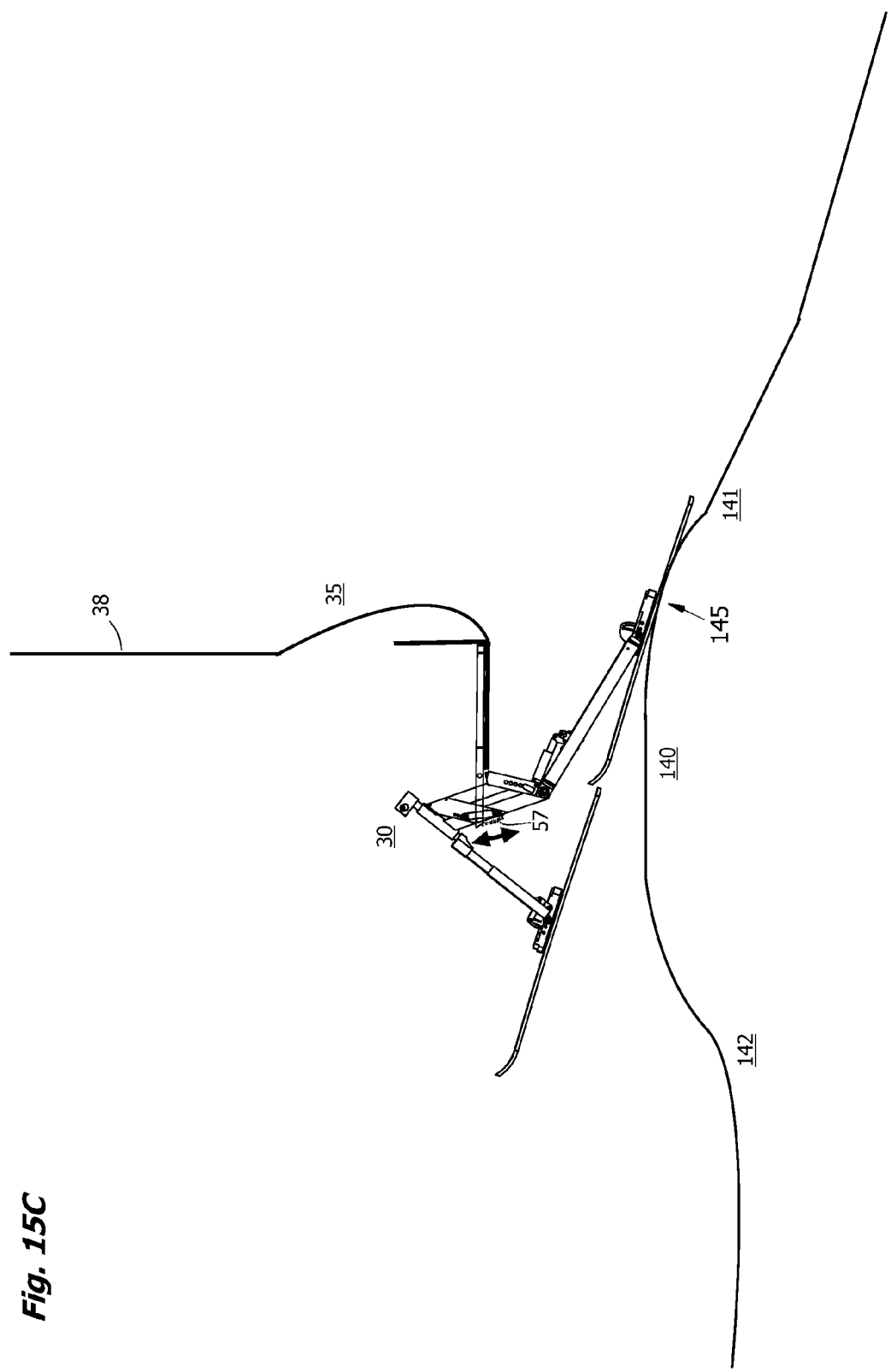

SKIBOB AND METHOD FOR RIDING A CHAIRLIFT

CROSS-REFERENCE TO RELATED APPLICATIONS

This application claims priority to provisional patent application Ser. No. 61/004,808, filed Dec. 1, 2007, from which priority is claimed under 35 USC 119(e).

FIELD OF THE INVENTION

This invention is related generally to apparatus and methods for skibobbing. Skibobs (also known collectively as skibikes, snow bikes, or snow scooters of Class 280) are gravity-propelled ski vehicles for travel across snow, conventionally having a bicycle-like frame with seat or saddle, but having a front and rear ski taking the place of bicycle wheels. Skibobs are generally ridden while seated as if on a bicycle; the rider wearing short footskis for balance, and controlling the rate and direction of descent by a combination of movements of the handlebar and the footskis. Structural adaptations for riding these vehicles while on chairlifts are also disclosed.

BACKGROUND

The genus 'skibob' has a long history, going back to the 19th century. Some of the first patented "skibobs" are described in U.S. Pat. Nos. 473,434, 485,345, 566,438, and 1,209,398 and are essentially a bicycle frame fitted with skis in which wheels are interchangeable with skis. This concept appears again in U.S. Pat. No. 5,738,361, where a pedal-powered "snow bicycle" is pictured, but the devices of interest here are gravity-propelled and are used recreationally for skiing down snow-covered slopes.

A modern variant is represented in U.S. Pat. No. 6,626,441, where the ski attachments include brackets intended for adapting a standard bicycle frame to small skis. Foot pegs are substituted for the pedals and crank. A bicycle saddle is mounted on a standard coil-spring shock absorber. Wound springs are used around the "axles" in the ski mounting brackets so as to bias the ski tips slightly upward, ensuring a safe landing in the event that the rider becomes airborne. A general method of riding a gravity-propelled skibob is shown in U.S. Pat. No. 4,097,055.

Skibobbing has proved to be an exciting winter sport; and U.S. Pat. No. 6,736,414 provides a recent review of commercialized versions. Not surprisingly, U.S. Pat. Nos. 3,588,138, 5,863,051, 6,626,441, and 6,783,134, and PCT Publication WO1998056640 are directed to collapsible frames. In U.S. Pat. No. 3,588,138, a seat (21) which pivots on the front post is supported by a posterior seat post with clamp member which detaches to collapse the seat. US Patent Application 2006/0197294 is also directed to a collapsible variant, but with a monoski, for "facilitating transport and access to ascending systems". Skibobs with laterally placed pairs of skis are also known.

Geary, in U.S. Pat. No. 6,783,134, also remarks on the need for improvement in accessing chairlifts, commenting that "a major disadvantage to the traditional skibob is that it's bulkiness does not lend it to transport on a standard ski lift. Selected embodiments of the [Geary] invention overcome this disadvantage by having the seat post collapsible such that the ski vehicle frame and seat fit underneath the seat of a ski lift . . . with the snow bike handlebars resting on the user's lap," essentially as shown in FIG. 20 of U.S. Pat. No. 6,783, 134. Geary further teaches, "The rider is able to sit down on the ski lift as a normal skier would with the snow bike handlebars resting on the user's lap. When exiting the ski lift the user places one foot underneath one of the foot pegs to support the snow bike until it contacts the snow. The user can then exit the ski lift as a normal skier would, return the seat post to its upright position and begin skiing. In other embodiments, a bracket can be mounted on the frame so as to project therefrom. The bracket is configured to support the frame on a seat of a ski chairlift when the seat of the ski vehicle is in the lowered position" (Col 1, line 58-Col 2, line 6). The method can be performed without the claimed bracket simply by holding the snow bike handlebars on the user's lap, but as commercially available, the bracket also braces the seat when in the upright position. Geary teaches away from the use of fixed frame skibobs in his method of riding a chairlift.

Note that the above art relates to normal skiers, and that for disabled and persons with limited physical abilities, barriers to access to the ski slopes with skibobs have not been addressed. It is generally impractical for a disabled person to manhandle a skibob on a chairlift as proposed by Geary. The rider using such a skibob risks dropping the skibob from the chairlift or being pulled off by the heavy skibob. The disabled rider is unlikely to be able to master the difficult challenge of jumping down at the offload platform, running clear of the moving chairlift, and reassembling the skibob seat before remounting.

"Sitskis" (which are essentially a seat mounted on a single ski) have been introduced for amputees and paraplegics, such as those shown in U.S. Pat. Nos. 4,632,408, 6,019,380, 6,036, 202 and 6,179,305. Originally, these skiers were raised and lowered out of the chairlift by an assistant or assistants, but these skiers have also learned to push up the seat "bucket", which is mounted on a pivoting arm fitted with a suspension, lock the bucket arm with a hand-operated lever, drop back into the oncoming chairlift bench, strap themselves to the bench, unlock the bucket arm, and at the top of the lift— unstrap and throw themselves down off the bench onto the chairlift offloading platform, using their arms for strength, and landing upright on the low-slung monoski. These individuals typically have strong upper body strength, and maneuver themselves using ski crutches, called "outriggers", strapped to their forearms. Not all disabilities are confined to the lower body, however, and skibobs are suited for a broad range of disabilities where a sitski is not appropriate. Skibobs permit many disabled persons to enjoy skiing, and improved access to chairlifts for these devices is a longstanding unmet need.

Other barriers to the use of skibobs exist for disabled persons. Ski lift operators have been fearful that a skibob will fall from the chairlift, injuring those below, or that a disabled rider will become ensnared in the chairlift and be dragged around the bullwheel. Also of concern has been the possibility that the skibob, if released when freestanding, can slide away from the rider's grip, possibly colliding with or tripping someone. Dismounting from a chairlift poses particular hazards, particularly given that the offloading areas of chairlifts frequently do not meet established standards.

Thus, there is a need in the art, for a skibob that can be enjoyed for a smooth and exciting ride, but be less physically demanding. Disabled riders are more likely to benefit from a progressive suspension, and to require mechanical adaptations for controlling the tips of the skis. The various features of the present invention improve access for disabled or sedentary persons to the ski slopes and contribute to the general safety of that experience for the rider and for other skiers.

SUMMARY

Chairlifts are popular at many ski facilities because riders are not required to climb the hill in order to ski down it.

Skibobs of the present invention are designed to permit a skibob rider to remain seated on the skibob when riding on the benchrest of a chairlift and to provide an assistive dismount at the top of the ski lift. The invention enables the rider to load onto a chairlift bench at the bottom of a slope and offload at the top while straddling or sitting on the skibob seat. While it is possible to hand carry a skibob on the chairlift, we have found that a better and safer solution is to ride the skibob onto and off of the chairlift, as would be particularly suited for disabled persons and those with limits in physical capacity. In a preferred embodiment, the skibobs of the present invention have a suspension configured to raise the undersurface of the seat of the skibob above the level of the chairlift bench without use of upper body strength, and have a benchrest receiving space under the skibob seat or saddle configured so that the chairlift bench can be received under the seat during the operation of loading the rider and skibob onto the chairlift. The chairlift bench then supports the skibob during transport on the ski lift. No disassembly of the seat is required to ride the chairlift.

Surprisingly, to offload or "debark" from the chairlift at the offloading platform, the rider need only lean forward as the rear ski contacts the platform and then ski down the offloading ramp. Spring means in the suspension and seat provide a "boost up" when the oncoming rear ski strikes and is forced upward by the leading slope of the offloading platform, shifting the rider's center of balance forward toward the handlebars and imparting forward momentum to the skibob, thus assisting the rider to dismount the bench and to ski down the offloading ramp ahead of the chairlift and away from the platform. The rider is then free to skibob down the slope, completing a full cycle without dismounting from the skibob.

Skibobs and methods embodying this novel functional combination are describe herein.

BRIEF DESCRIPTION OF THE DRAWINGS

The teachings of the present invention can be readily understood by considering the following detailed description in conjunction with the accompanying drawings, in which:

In FIG. 4A spring 57 is extended and the seat frame 50 is lowered; in FIG. 4B spring 57 is contracted and the seat frame is raised.

FIG. 5B shows a long axis cross-section through a seat, and also shows the clearance (dotted line) volume under the seat which would be needed for a chairlift bench operating in the method of the invention. The drawing is not to scale.

FIG. 7 is an exploded view of a suspension.

FIG. 8 is an exploded view of a seat pivot assembly.

FIGS. 11A and 11B are exploded views of a rear ski/ski mounting block/swingarm assembly.

FIGS. 12A and 12B are exploded views of a front ski/ski mounting block/fork assembly.

FIGS. 15A through F describe an assisted method for unloading a rider from a chairlift benchrest.

DETAILED DESCRIPTION

Figure 1A:
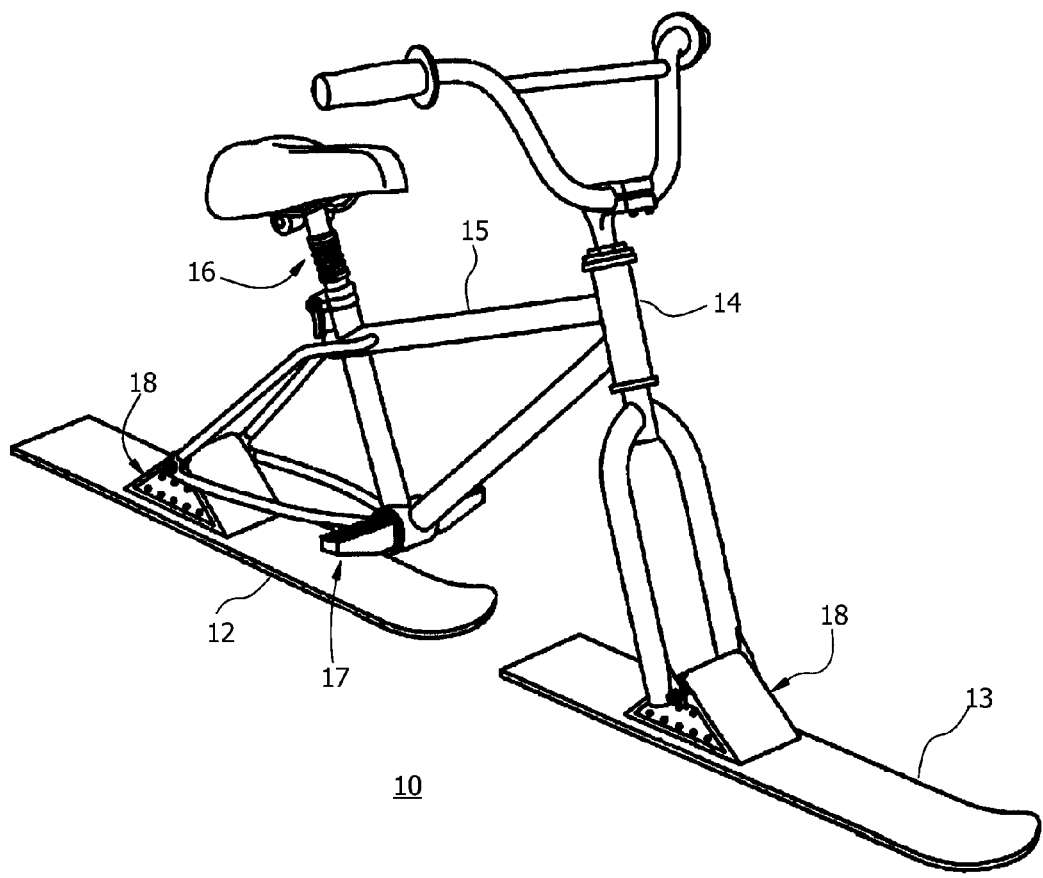
FIGS. 1A through D are views of the prior art.

Although the following detailed description contains many specific details for the purposes of illustration, one of skill in related arts will appreciate that many variations and alterations to the following details are within the scope of the invention. Accordingly, the exemplary embodiments of the invention described below are set forth without any loss of generality to, and without imposing limitations upon, the claimed invention.

DEFINITIONS

Chairlift—also termed a "ski lift", is a machine having chairs or benches suspended from a moving cable, wherein the cable is driven so as to carry the benches up and down a ski slope in a continuous loop. At the base of the slope, the chairlift crosses a loading platform where skiers load onto the benches; at the top of the slope, the chairlift crosses a offloading platform where the skiers offload (debark) from the benches and exit the chairlift. The offloading platform includes an ascending slope leading to a flat space for offloading, followed by a descending slope or "exit ramp" where the rider can ski down ahead of the moving chairlift. The slope leading to the offloading platform is termed the "foreslope".

US chairlift operators are required to set the height of the benches of their chairlifts at 18 inches (plus or minus 2 inches) from the snow on the uploading and offloading platforms. While this would seem to provide reasonable consistency and predictability in the structural innovations needed for a chairlift-rideable skibob of the present invention, in practice the level of the platforms are by no means so consistent. Platform clearances more typically range from 16 to 25 inches. Benchrests typically have a depth (front to back of the seat) of about 18 inches. The pad of the benchrest may be up to 6 inches in thickness at the leading edge. These dimensions require proportionate design of the undersurface benchrest receiving space of the skibobs of the present invention so that the benchrest can be received under the seat and contactingly support the skibob during transport on the ski lift.

Frame—the rigid support members at the core of the skibob, as analogous to the central frame of a bicycle, which is often either trapezoidal or triangular. The "rear" (posterior aspect) of the frame refers to parts which are related or proximate to the rear ski in some way, and the "front" (anterior aspect) to parts related or proximate to the front ski. The frame may be bolted or welded together and may optionally be collapsible. Typically, to reduce weight, tubestock is used in the manufacture of frames, although cast or extrusion molded parts may sometimes be used.

Cantilever—in one sense, refers to a projecting structure, such as a beam or platform, that is supported at one end only and carries a load at the unsupported end or along its length, and in another sense refers to a "pivoting cantilever" such as a seat member comprising a beam or platform with seat, that pivots on a supporting fulcrum, and is configured to so that the seat may swing up and down in a defined range and support the cantilevered weight of the rider on the seat. Optionally the load is distributed to a lever arm on the opposite side of the fulcrum. The pivoting cantilever may be spring loaded or be fitted with other biasing means.

Spring means—includes spring configurations selected from extension spring, compression spring, coil spring, helical spring, torsion spring, leaf spring, frequently made from spring steel, and also alternatives to classical springs such as pneumatic canisters (eg. gas springs) and elastomeric polymers (eg. bungee cords) such as would be equivalent means in the art. The spring force is selected for the application and may be adjustable by the user.

Shock absorber or "shock"—A compound device such as a combination of spring, springs, pneumatic or hydraulic pistons, and other elements, used to dampen out-of-plane excursions sustained in moving a load across a generally planar but uneven surface. The term commonly refers to spring coil and the cylinder piston elements in combination, more literally "coil over shock" designs, in which the spring and shock elements are compressed and extended as a single package. Preferred in the embodiments of the present invention are extensible, telescoping, shock absorbers, which include for example stacks of coils with higher and lower spring constants in combination with one or more compression dampening cylinders, characterized in a preferred embodiment by a force-travel curve wherein resistance increases as the suspension bottoms out. These are often used in conjunction with a gas canister which can be pressurized to adjust stiffness. Shocks are also used here as an active suspension element that can store compression energy and release it in a reactive motion.

Undercarriage—refers to the elements of a full suspension design, ie. the shock absorbers mounted on the front forks and the linkage mechanism and/or shock absorber mounted on the rear swingarm. Suspension designs include those reviewed in U.S. Pat. No. 5,509,679 to Leitner, U.S. Pat. No. 6,783,134 to Geary, and in U.S. Pat. No. 6,926,298 to Ellsworth, among many others, all of which are incorporated herein by reference.

Four-bar linkage with swingarm—refers to four rigid bars or "links" attached at pivots in the form of a trapezoid or crossed trapezoid, the lengths of the rigid elements being determined by the application. Without departing from convention, the four links can be named the "frame" or "ground" link (referring here to an element of the frame of the skibob), the "swingarm" (also known as the "input link"), the "follower link" and the "coupler link". The swingarm is a long arm that connects the rear ski to a "swing arm pivot" on the frame. The swingarm consists of the input link and an extended lever arm. The swingarm pivots around the swing arm pivot so that the rear axle with ski is free to move up and down in response to bumps in the snow surface. A shock absorber is usefully attached at one end to the follower link or coupling link and at the other end to the frame, and functions to dampen the motion of the swingarm and provide elastic energy. The precise geometry and elastic response of the shock absorber and the geometry of the linkage determines the kinematics of the swingarm.

A Chebyshev linkage is a species of the four-bar linkage type, unique in having a crossed input and follower (a crossed trapezoid resembling a figure-eight). Surprisingly, by attaching a shock absorber to a Chebyshev linkage and placing the coupler linkage in tension, a favorable progressive force-travel curve was obtained in a smaller package. In the modified Chebyshev configuration of selected embodiments of the present invention, the coupling link is in tension, not compression as would be characteristic of conventional four-bar linkage suspension mechanisms. Thanks to this configuration, the space required by the linkage is compressed, as useful here to optimize the benchrest receiving space. The suspension linkage is thus one embodiment of the invention, although other linkages, for example the 4-bar linkage disclosed by Geary (FIG. 2 of U.S. Pat. No. 6,783,134), may be used if the configuration is adapted to provide the necessary cantilevered seat and benchrest receiving space.

Travel—is related to the structure of the four-bar linkage and how far the suspension shock absorber compresses under a load on the swingarm. Rear suspension travel is measured vertically or by tracing the path of the movement (i.e. "the travel of the rear axle tip of the swingarm"). By convention, travel is interpreted vertically. "Bottomed out" means that the suspension has reached its maximum travel and moves with the frame. As used here, travel relates more particularly to the change in height of the underside surface at the lower rear edge of the seat assembly. As used here, travel can also refer to the movement of the tailend of the seat assembly on a pivot axle or pin at a supraposterior fulcrum of the frame or a combination of the movement of the seat due to both the suspension and the seat pivot.

Leverage ratio—is the rate between the amounts of rear suspension travel and the shock compression. If a shock is compressed 1 cm in length for every 3 cm of rear axle travel, the suspension has a 3:1 shock leverage ratio. Values of about 2 or 3 are used on most conventional designs. Larger leverage ratios put higher stress on the shock, and are associated with less sensitive tracing of the terrain. This simplification is adequate for most purposes, but it should be recalled that the shock absorber has both a spring, with spring leverage ratio, and a cylinder with shock leverage ratio, and that some shock absorbers have multiple complex elements for varying the leverage ratio. The leverage ratio may vary, as would be apparent from a non-linear force-travel plot for the suspension. If the leverage rate increases as the rear axle rises (meaning that the farther up the rear axle moves, the less the relative change in the shock or spring length is), the progressive rate is said to be a "rising rate".

Progressivity—is used with two meanings—referring both to the geometry of compression of the shock and to the dampening force exerted by the shock. Geometrical progressivity describes the changing of the leverage ratio throughout the travel. A progressive or "rising rate" suspension means the amount of travel decreases as the leverage ratio increases. Looking at force, we can talk about the "real" progressiveness of the suspension. The deformation of the swing arm produced by a specific increment of force is also a ratio, and the changing ratio reflects a change in the balancing or opposing force performed by the shock as a function of the position of the swingarm. Thus, a progressive suspension "stiffens up" at larger travel positions and is bottomed out only under extreme forces.

Unless the context requires otherwise, throughout the specification and claims which follow, the word "comprise" and variations thereof, such as, "comprises" and "comprising" are to be construed in an open, inclusive sense, that is as "including, but not limited to".

Reference throughout this specification to "one embodiment" or "an embodiment" means that a particular feature, structure or characteristic described in connection with the embodiment is included in at least one embodiment of the present invention but not necessarily all embodiments. Thus, the appearances of the phrases "in one embodiment" or "in an embodiment" in various places throughout this specification are not necessarily all referring to the same embodiment.

Furthermore, the illustrated features, structures, or characteristics may be combined in any suitable manner in one or more embodiments.

DETAILED DESCRIPTION

Turning now to the figures, FIG. 1A shows a first prior art skibob with a pair of patented adaptors 18 for mounting front and rear skis 12, 13 on a bicycle frame 15. The handlebars and front forks are mounted in a journaled sleeve 14 so that the front ski can be turned for steering. The conventional bicycle seat includes a stempost with coil spring assembly 16 for absorbing bumps. The skibob is described in U.S. Pat. No. 6,626,441 to Hanson.

Figure 1B:
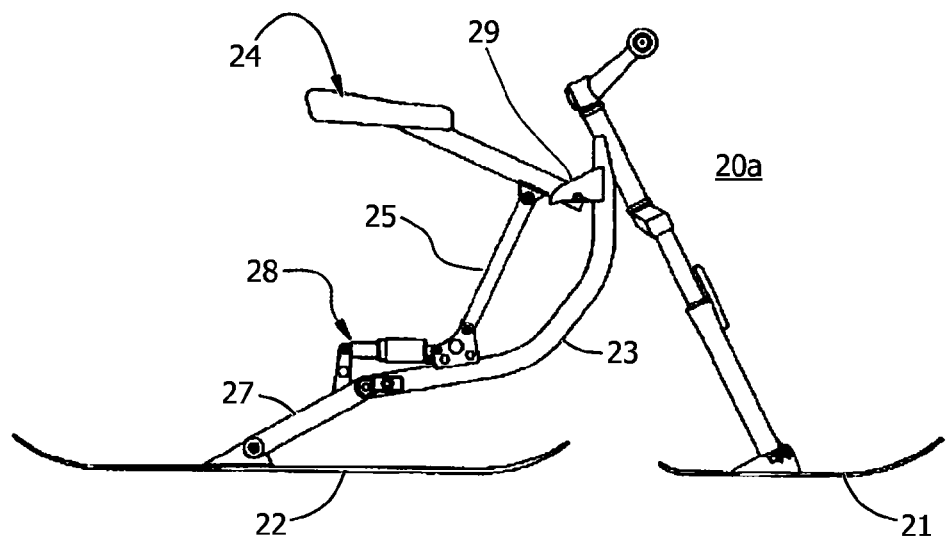
Figure 1C:
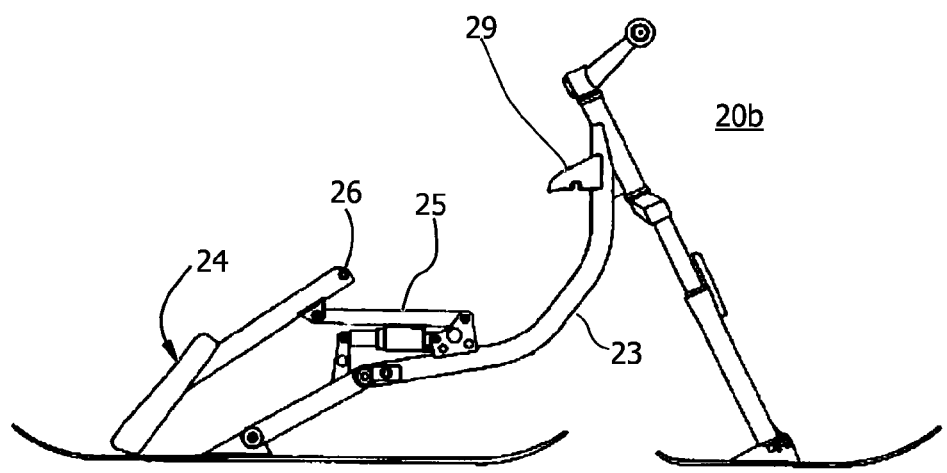

FIGS. 1B and 1C show a second prior art skibob. The skibob has two configurations (20a and 20b). In configuration 20a, a seat 24 is mounted in an upright position supported by pivotable strut 25 for riding the skibob. In configuration 20b, the seat 24 is folded flat behind the frame 23 so that the skibob can be carried on a chairlift by hanging the frame 23 from the edge of the chairlift by bracket 29 or by holding the handlebars while letting the frame dangle below. Bracket 29 also serves to secure the seat 24 in the upright position by means of clasp pin 26. In other respects, the frame 23 no longer resembles a conventional bicycle, and includes front and rear skis 22,23, rear suspension assembly 28 and swingarm 27. As taught by Geary (see FIG. 20 of U.S. Pat. No. 6,783,134), the purpose of the pivotable/detachable seat assembly is to fold the seat down so that the rider can get on a chairlift bench while carrying the skibob—without the impediment of the seat in the way. In a preferred method, the chairlift bench inserts itself above the retracted seat but below bracket 29 and hits the front frame 23, catching on the bottom side of the bracket 29. The chairlift then raises the rider off the ground and the rider holds on to the skibob to prevent it from falling.

Figure 1D:
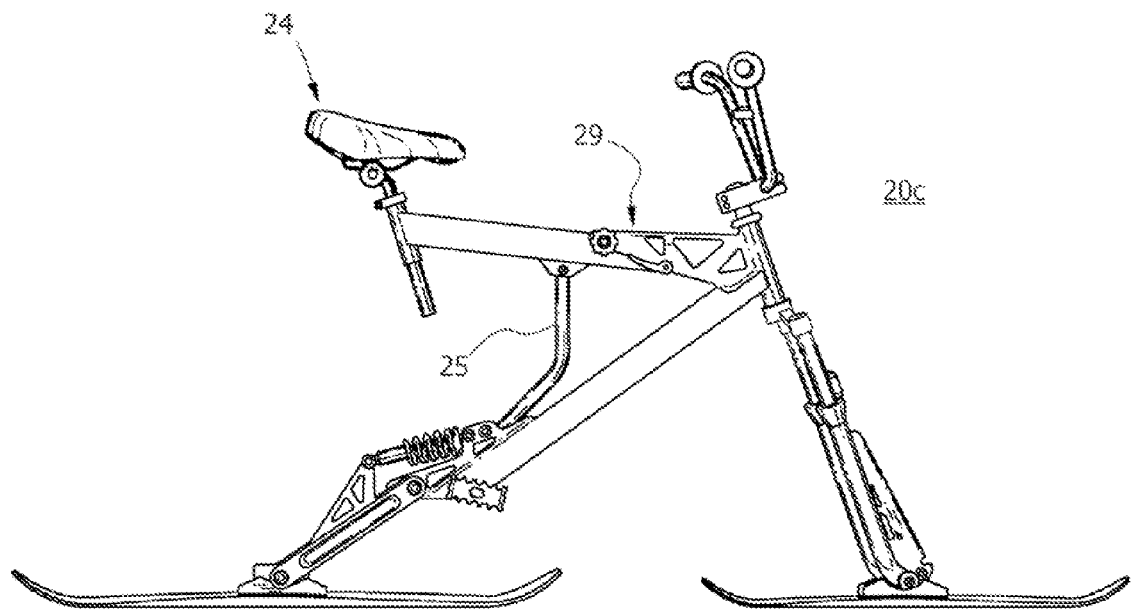

In FIG. 1D, the Geary skibob is illustrated as sold commercially (20c). It can be clearly seen that the "third generation" Geary seat 24 is intended to fold down under the chairlift bench and not to ride on top of it. A latching mechanism 29 with safety catch and pivotable supporting strut 25 is clearly shown. The Geary seat closely resembles a stock bicycle seat with a stempost for adjusting the height.

Comparing first prior art skibob of FIG. 1A with second prior art skibob of FIGS. 1B-D, it can be seen that the frame 15 and seat assembly 16 of the first prior art skibob prevent the insertion of a chairlift bench under the seat 16 so as to support the skibob on the chairlift. This skibob cannot be used in the method of Geary (U.S. Pat. No. 6,783,134).

Figure 2:
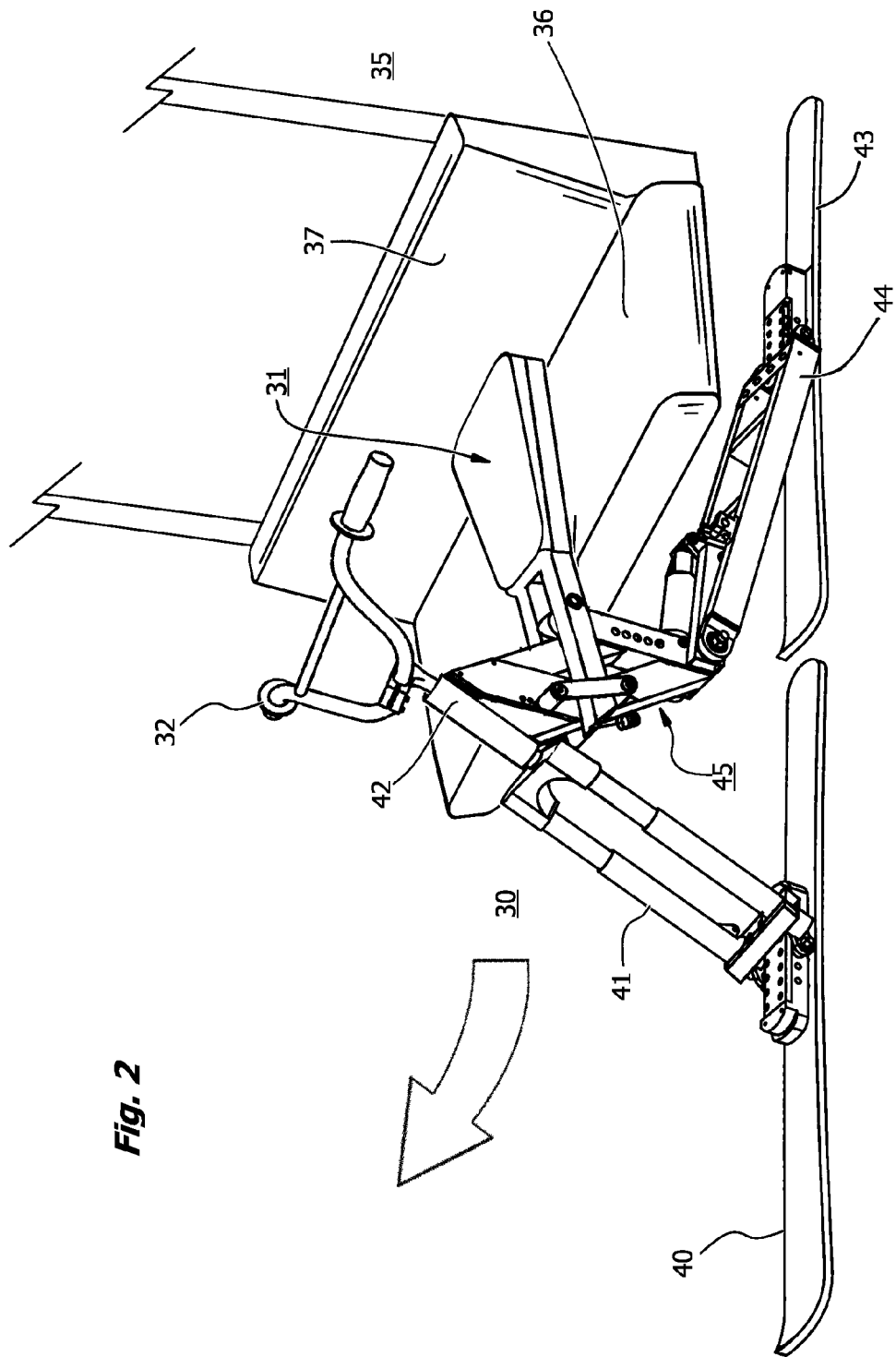
FIG. 2 is a perspective view of a skibob of the present invention supported by a chairlift bench for transport on a chairlift while the rider (not shown) is seated on the seat 31 of the skibob.

Now turning to a first skibob of the present invention, FIG. 2 shows how a rider on skibob 30 sits on a chairlift bench 36 when ascending a ski slope (large arrow). The seat 31 of the skibob rests on benchrest 36 and is held in place by the rider's weight. When picking up the rider, benchrest 36 is inserted under the seat 31, in contrast to the method of Geary (U.S. Pat. No. 6,783,134 above). The rider remains seated on the seat of the skibob during this procedure and can lean against the backrest 37. The skibob with skis 40 and 43 is lifted off the ground while the rider remains seated on the seat of the skibob. This method of riding a chairlift requires modification of a skibob seat, frame and center of gravity according to the teachings disclosed here.

The skibob (30) of FIG. 2 cannot be used in the method of Geary (U.S. Pat. No. 6,783,134) and conversely, the skibob of Geary cannot be used in the method shown here. Seat 31 and frame 45 of a skibob of the present invention are structured so that the chairlift benchrest 36 can lift and supportingly transport the weight of the skibob in an uncollapsed configuration. The seat member is adapted to be stably supported by the chairlift benchrest, which is fitted under the seat when riding on the chairlift. These adaptations enable the rider to load skibob 30 onto a chairlift and unload without the rider's need to dismount from the seat of the skibob. Structural adaptations in support of this inventive process are discussed further in the remaining figures.

A comparison of skibob 30 with skibob 20b,20c of FIGS. 1C,D clearly reveals that seat 24 is not intended to and cannot be used to ride stably on top of a chairlift bench without modification away from the teachings of Geary. A comparison of skibob 30 with skibob 10 shows that frame 45 with seat 31 are structured to enable the entry of a chairlift bench 35 under the seat 31 of the skibob, and contrastingly that frame 15 with seat 16 does not enable this process.

Thus in one embodiment, the invention is a method for conveying a rider and skibob up a ski slope on a chairlift in which a defining process step is the transport of the skibob 30 and rider (not shown) on the chairlift 35 in such a way that the rider remains seated on seat 31 while seat 31 is stably supported by the benchrest 36 during transit. The weight of the rider holds the skibob in place; seat 31 is securely compressed or "sandwiched" between the rider's buttocks and the benchrest 36. This process has the advantage that disabled or sedentary individuals can more readily ride a chairlift and then ski down a ski slope, all the while remaining mounted on seat 31. The method for conveying a rider and skibob on a chairlift also may include loading and unloading procedural steps which will be described in a later section.

Returning to the drawings, the frame 45 of skibob 30 has an anterior aspect with front forks 41 and front ski 40, a posterior aspect with rear swingarm 44 and rear ski 43, and a seat member 31 for the rider, wherein the seat member is rearwardly cantilevered from the posterior aspect of said frame. When the rider is seated on the chairlift, handlebars 32 are in reach of the rider with the rider's back against backrest 37. The handlebars 32 steerably rotate in journalled sleeve 42.

Figure 3:
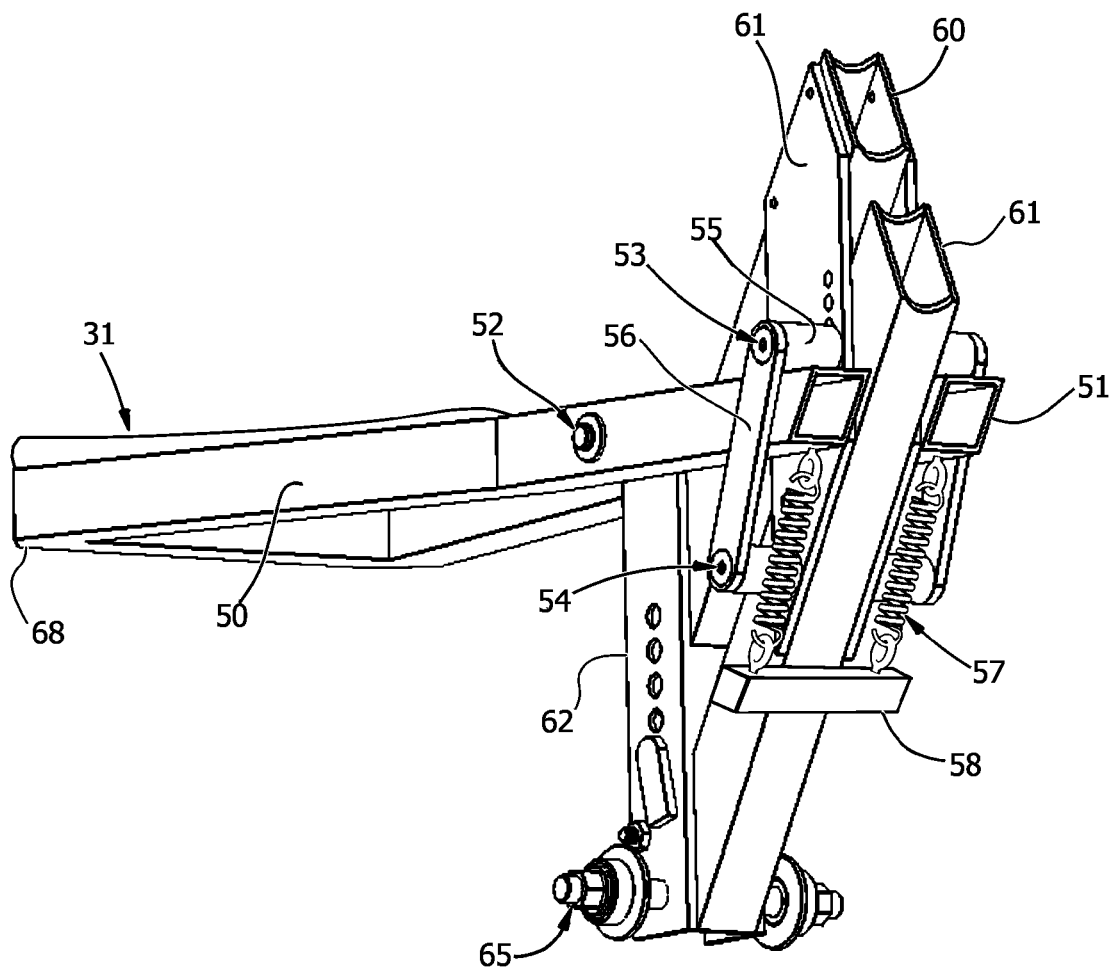
FIG. 3 is a mechanical drawing of the frame and seat assembly.

FIG. 3 is a mechanical drawing of the main elements making up the core of frame 45, which can be a welded tubular frame or a bolted frame as shown here. Journalled sleeve 42 is welded to the frame at upper crossbar 60 and lower crossbar 61. Upright frame member 62 contains an adjustable height seatpost (77, FIG. 8) and supports the pivot attachment point 65 for the rear suspension. Seat member 31 includes a trapezoidal supporting frame 50 with two anterior seat lever arms 51 extending forward from the seat assembly, as are visible to the right and left of crossbar 61 under bumper stops 55. Seat supporting frame 50 is attached to the main frame at pivot 52. As can be seen, bumper assemblies 53 and 54 with bumper stops 55 limit the range of pivot of the anterior seat lever arms 51, which are enclosed between seat retaining bars 56 and sideplates 61. Tensioned coil springs 57 bias the seat lever arms downward and attach to bracket 58 or to another frame attachment point.

Pivot 52 serves as a fulcrum; anterior seat lever arms 51 are biased downwards by biasing means 57, which is opposed by any counterweight on seat 31. Lever arms 51 are drawn down against bumper stop assembly 54 by the action of bias means 57, here shown as a coil spring. Other spring means, including leaf springs, shock absorbers with pneumatic dampeners, elastomeric spring means and so forth, are also conceived.

The means for biasing 57 and seat assembly 31 pivot can be configured so that during unloading from the chairlift bench, when the rear ski is thrust upward by impact or contact with the ascending slope of the unloading platform (in the manner of a cam follower), the rider's center of balance will be shifted forward toward the handlebars, imparting forward momenturn to the skibob just as the rider is dismounting the benchrest and skiing off the unloading platform, as will be explained more fully below. The spring means are configured on the lever arm or arms so as to optimize the mechanical advantage of the fulcrum and lever.

A preferred method for riding a chairlift according to the invention comprises a step for riding on a benchrest of the chairlift with the seat member supportingly and stably held in place between the buttocks of the rider and the chairlift bench. To accomplish this, rearmost cantilevered aspect of the seat 68 is configured to rise to an elevation sufficient so that chairlift benchrest 36 can be inserted under the seat frame 50,68 during the loading procedure as shown in FIG. 2.

Figure 4A:
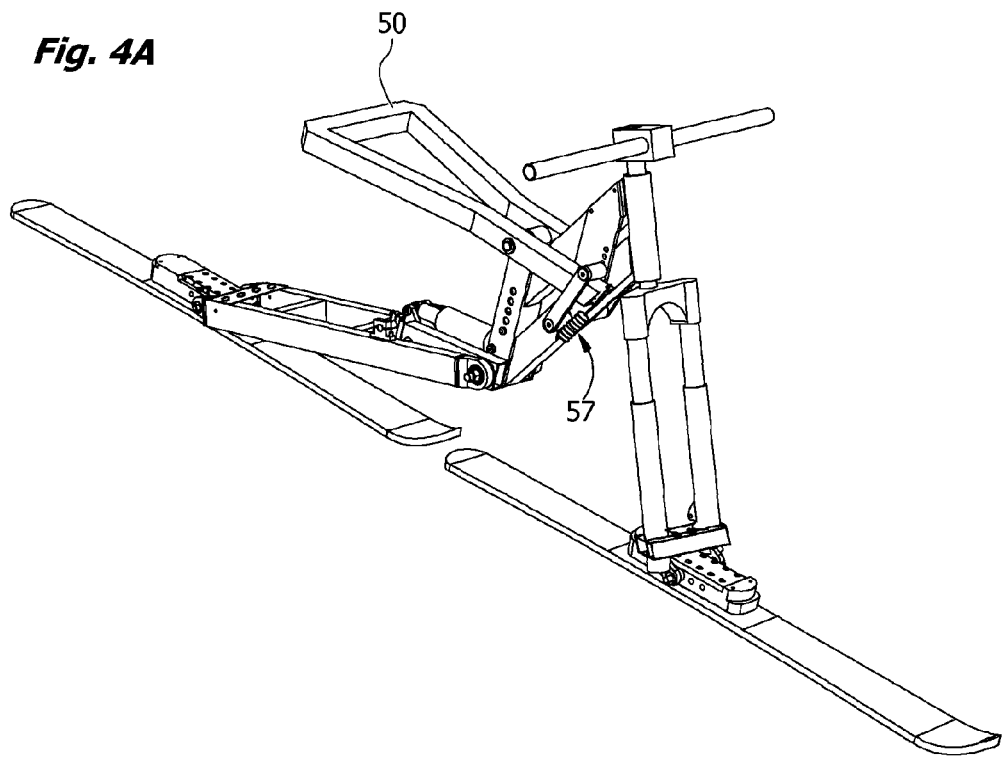
FIGS. 4A and 4B are perspective views of a skibob seat apparatus.
Figure 4B:
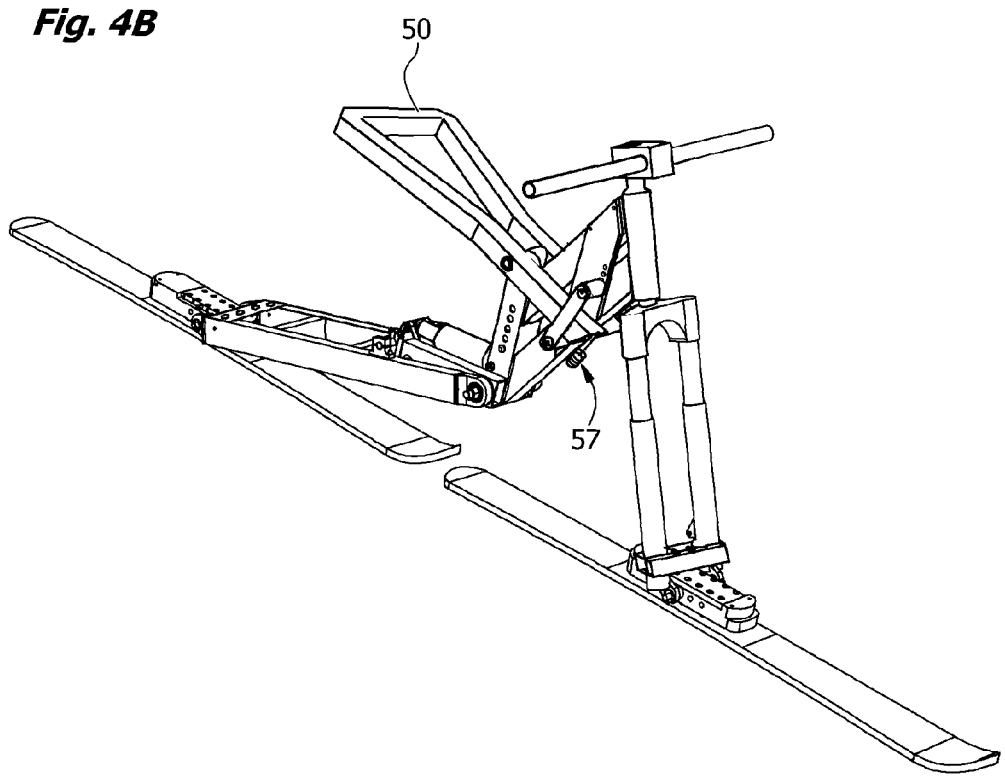

FIGS. 4A and 4B are paired views of the skibob, FIG. 4A with the tail of seat frame 50 shown pivoted in the downwardly lowered position (note extended spring member 57), and FIG. 4B with seat frame 50 in the upwardly raised position (note relaxed spring member 57). The underseat clearance in FIG. 4A is perceptibly less than the underseat clearance in FIG. 4B, as may be required to receive the chairlift bench under the seat during chairlift loading. The underside surface of the seat member at the tail has a range of travel to a height H2 from the ground level and H2 is preferentially in the range of 18 to 26 inches.

Figure 5A:
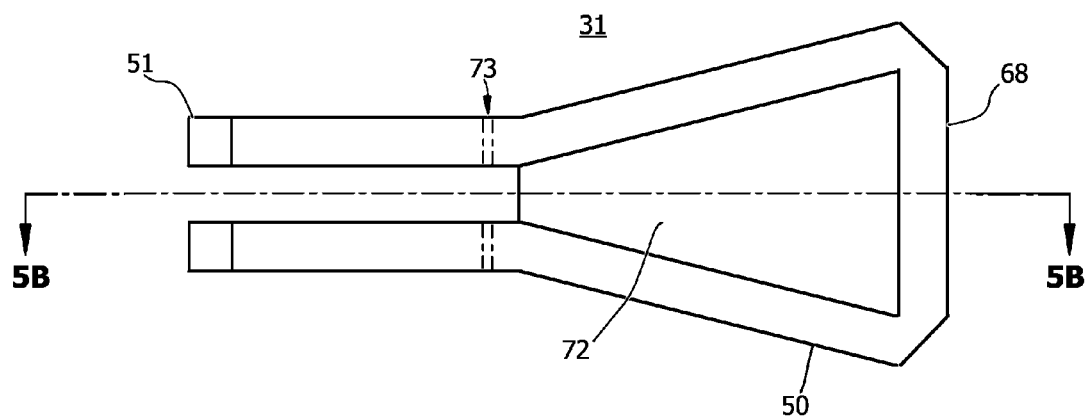
FIGS. 5A and 5B are plan and sectional views of a representative seat assembly.

FIG. 5A shows a view of the seat member 31 from the underside, depicted here with trapezoidal lateral aluminum tubes that form seat frame 50. The planar surface formed by the contralateral projections of the seat frame serve to stabilize the rider when on the chairlift bench. Bolts or axles are used to position the seat assembly on the frame through pivot hole 73, the pivot hardware forming a fulcrum for the pivotingly cantilevered seat member. The seat is prevented from folding down during use, but may optionally be disconnected for storage or transport. The rearmost cantilevered aspect 68 or "tail" of the seat is again shown as are the forward tips 51 of the anterior lever arms. Also shown is the position of centerline section 5B through the seat. The seat member can be modified to suit the design, but generally includes at least two rails or rail-like segments that form a substantially planar undersurface for the seat. This planar undersurface stabilizes the skibob when supported on the top surface of the benchrest. The rail segments can be parallel to each other and parallel or crosswise to the long axis of the skibob, or the rail segments can form a "tee". The rail segments need not, however, be parallel, but may merely be contralateral to each other while forming a plane suitable for contacting the top surface 36 of the benchrest. In one embodiment, the rail segments are contralateral and generally parallel to the long axis of the skibob, thus allowing the skibob to more easily slide off the benchrest. The rail segments may also serve as a frame for assembly of the seat (72,74), which may be a fabric stretched between the rails or a pad supported on the rails, and so forth, optionally with other supporting substructure such as shown in FIG. 5B.

Figure 5B:
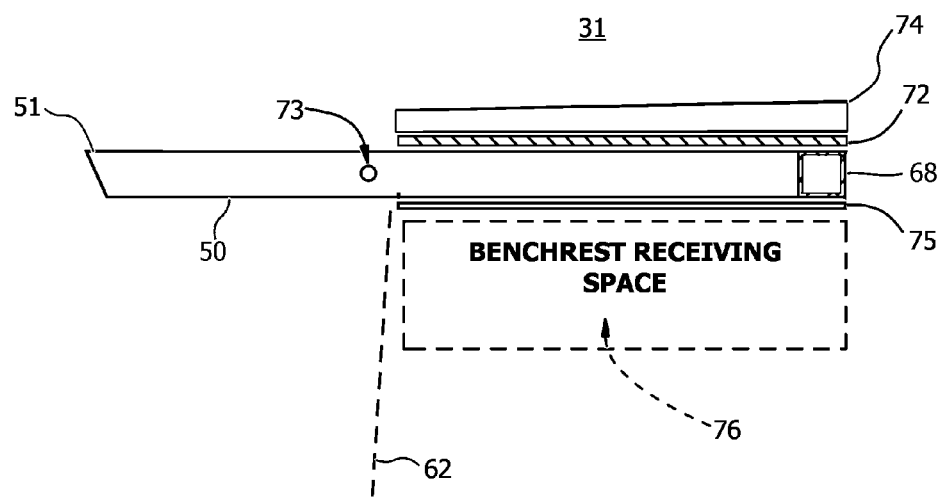

FIG. 5B illustrates a sectional view B through the seat assembly 31, with padded or stretchable seat cover 74, an optional aluminum seat plate 72, and tubular frame marked 50. An optional underlayer 75 is also shown. The cross-section through the rearmost aspect of the seat 68 cuts frame 50. Shown with a dotted box is the "benchrest receiving space" (76) on the underside of the seat, which is configured so that the chairlift benchrest 36 can be received under the seat and support the skibob during the ride up the ski slope. This clearance space 76 is between the seat and the rear suspension. The rear suspension drops down during transit. This benchrest receiving space is typically about or greater than 4 inches in height and at least or about 16 inches in depth, most preferably 18 to 20 inches in depth, as measured from the rearmost aspect of an upright frame member (dotted line 62) to the rearmost lower edge of the skibob seat 68, and is proportioned so that the chairlift bench member 36 can be positioned fully and stably under the seat for the lift maneuver and during the ride up the slope. Optionally, provision is made for a layer or layers of material 75 on the underside of the seat and tubular frame that are selected to improve the stability of the seat on the chairlift bench. By matching the underside surface material with the surface layer of the bench, a secure contact interface can be formed that disengages during the unload process. Many chairlift benches, but not all, are cushioned and are not slippery, but others are simple wooden structures and may thus require a deformable layer on the underside of the seat to better grip the bench. The seat member has an underside surface that is generally planar at points of contact with the benchrest and is shaped so as to stabilize the contact with the supporting surfaces of the chairlift bench when riding the lift with the weight of the rider on the seat. The underside surface of the seat may be fitted with generally longitudinal rails to facilitate unloading. These longitudinal rails form a generally planar underside surface of the seat member.

Figure 6:
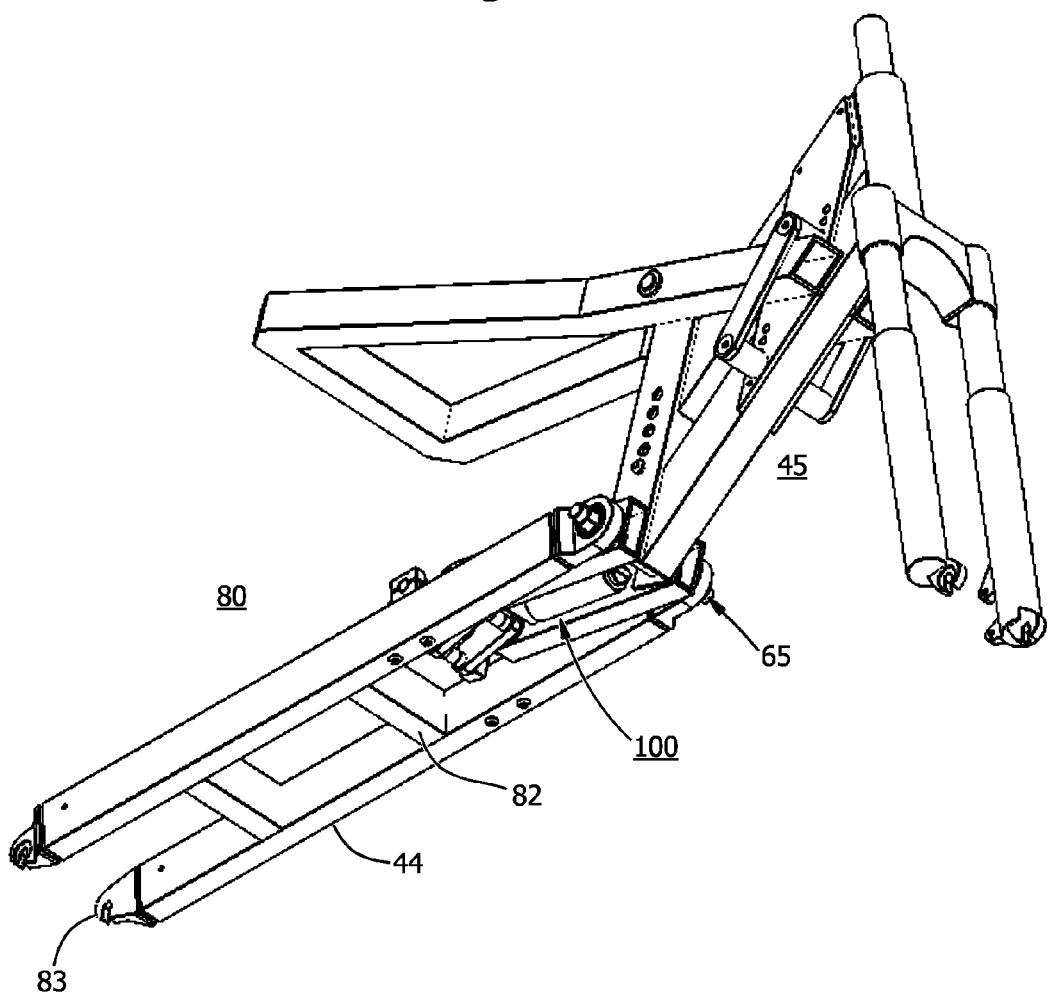
FIG. 6 is a perspective view of the underside of a skibob frame with front fork and rear suspension assemblies.

FIG. 6 is a perspective view of the underside of frame 45 with rear suspension assembly 80. The rear swingarm 44 is seen attached to the frame at center pivot 65. Shown here are optional dual struts and braces 82. A rear bracket or "dropout" 83 is provided for attachment of rear skis. Single arm rear suspension configurations are also conceived.

FIG. 7 is an exploded view of a preferred rear suspension. The rear lower aspect of the frame of this embodiment attaches to the rear suspension assembly 80 at swingarm pivot pin 83 with ground link 84. Also shown is a shock absorber 100. The right and left swingarms 44a,44b mount on the swingarm pivot pin 83 at the apical posterior lower base of the frame.

It can be observed that the center of gravity of the frame is configured posteriorly on the frame by the weight of the swingarm, assisting in stabilizing the skibob when riding a chairlift.

Also shown is an optional four-bar progressive suspension with shock absorber 100, ground link 84, follower link 85a, 85b, coupler link 87a,87b, and swingarm input linkage 44a, 44b. Coupling pins 88 and 86 join the links. Pin 88 is fixed to swingarms 44 by mounting brackets 89a and 89b and joins coupler link 87a,87b. Pin 86 joins follower link 85a,85b and coupler link 87a,87b. The 4-bar suspension and linkage mechanism is shown in more detail in FIG. 9.

FIG. 8 is a detail of the seat pivot assembly 52 with seatpost 77 and locking pin 78. Adjustment of the seat height can be useful to better fit the rider, and also to adapt for the height of the chairlift above the loading ramp, which can vary from day to day and place to place. Final assembly of the seat pivot 52 in upright frame member 62 is shown in accompanying FIG. 7.

Figure 9A:
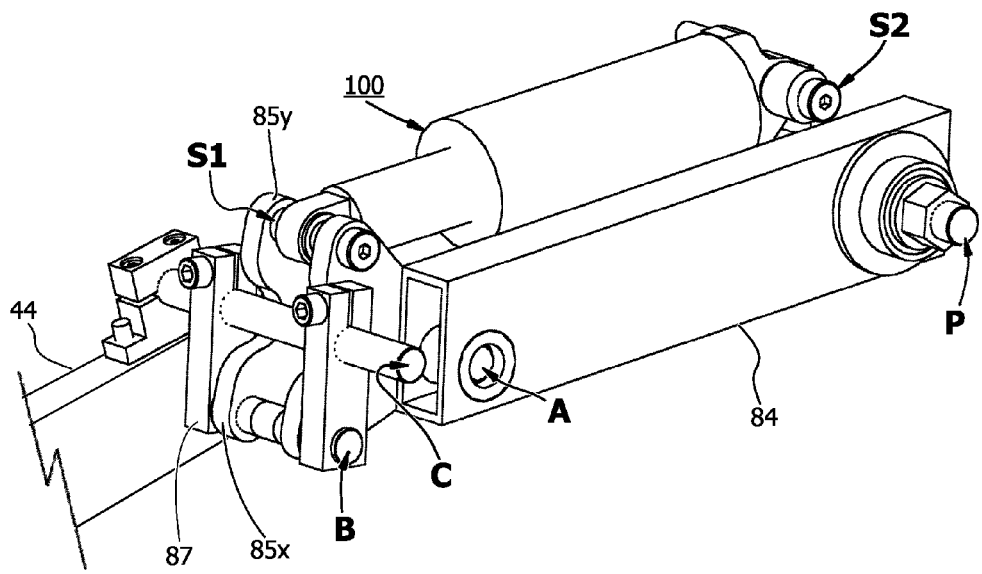
FIG. 9A is a detailed view of a progressive suspension with 4-bar linkage.

Turning now to FIG. 9A, shown is a mechanical drawing with details of a 4-bar modified Chebyshev linkage. "P" is the swingarm pivot and pivots A, B and C are the apexes of the 4-bar linkage. Element 84 is the ground linkage. Swingarm 44 is the input linkage. Pin C (88) joins the coupler linkage 87 and the input linkage. Pin B (86) joins the coupler linkage 87 and the follower linkage 85. The follower linkage 85 is a triangular, "butterfly-shaped" solid with first "wing" 85x attached to the coupler linkage, and second wing 85y serving as a lever arm for mounting a first end (S1) of shock absorber assembly 100, and pivots on axis A. Wings 85x and 85y are fabricated as a single piece 85 and the angle between wings

85x and 85y is fixed. The pin 86 at "A" joins the ground linkage and the follower linkage. The second end of the shock absorber 100 is mounted to the frame at S2.

Figure 9B:
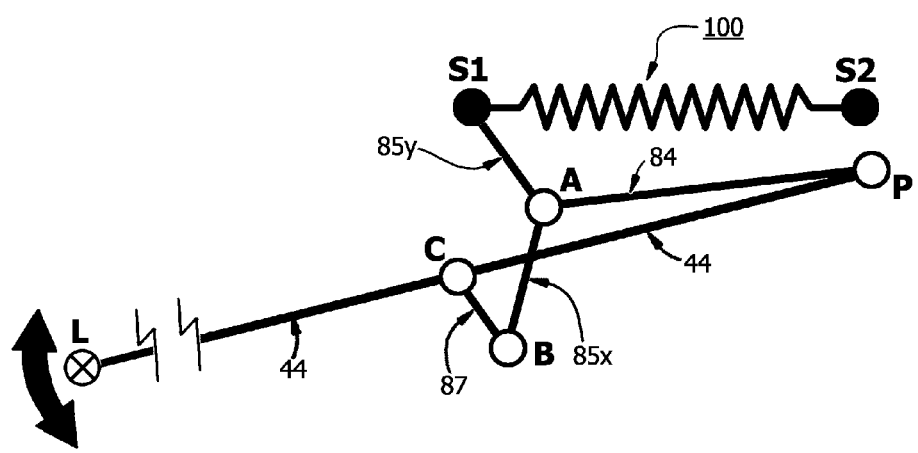
FIG. 9B is a schematic of a modified Chebyshev linkage illustrated in one embodiment of the invention.

The linkage is shown schematically in FIG. 9B. The swingarm 44 is the "input link" and runs from the ski mounting bracket "L" (shown with a crossed circle) to the swingarm pivot "P", where it connects to the ground link 84. Bumps and other loads at "L" drive the motion of the input link. Coupler link 87 connects the follower link at "B" to the input link at "C" and is in tension when the ski strikes a bump. The butterfly-shaped element 85 is "follower" link and is also connected to the ground link at "A". The two "wings" 85x,85y of the follower link connect to, respectively, the coupling link 87 at "B" and to a first nose of the shock absorber 100 at S1. The second nose of the shock absorber is pinned to the frame at S2. Follower link 85y on pivot "A" acts as a lever arm in engaging the shock absorber.

This modified Chebyshev linkage mechanism cannot be conceptualized as a standard four-bar linkage; the coupling link 87 is in tension between the swingarm and the lower wing 85b of the follower link. It can be seen that as swingarm 44 moves up in response to a bump, coupler link 87 is pulled upward, torsioning the butterfly link 85 so that a compression pulse is transmitted to the shock absorber. This configuration serves to reduce the suspension to a compact horizontal package that maximizes underseat benchrest receiving space 76 for receiving the chairlift benchrest 36, maintains clearance from the ground, and provides a generally linear progressive response to torsion of the swingarms 44. This inventive Chebyshev 4-bar linkage is configured with swingarm, follower link and coupler link, and an extensible shock absorber attached at a first end to the frame and at a second end to a lever arm on the follower link, wherein the coupling link is in tension. The Chebyshev linkage and rear suspension is configured for a travel of greater than 5 inches, preferably greater than 7 inches and most preferably about 8 inches and is generally provided with a progressive shock absorber.

When airborne, the swingarm pivots downward due to relaxation of the spring in the shock absorber and to gravity, extending the shock absorber. When impacting a surface, the swingarm pivots up, compressing the shock absorber. Because of the elastic nature of the progressive shock absorber, this energy can be used to assist in unloading the skibob from the chairlift.

Figure 10:
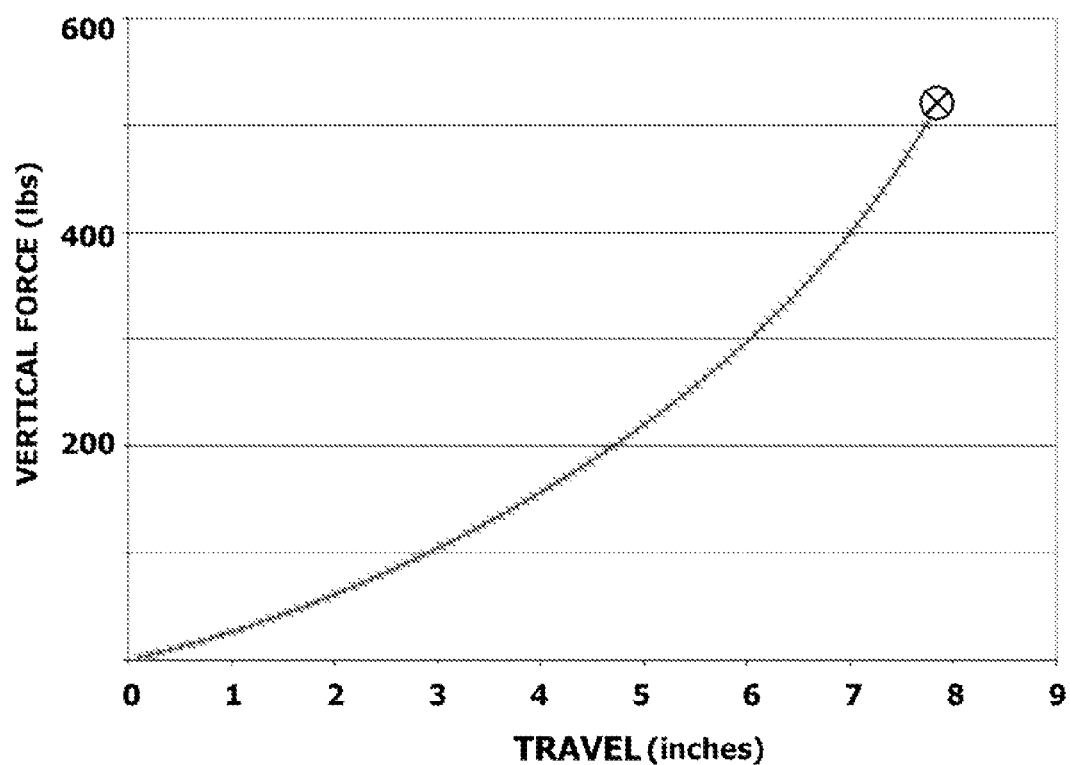
FIG. 10 is a force-travel curve for a suspension.

FIG. 10 is a plot of force versus travel for the rear suspension assembly of FIG. 9A. The linkage is clearly progressive and has a rising rate. The curve shows the travel of the seat as the rear suspension of FIG. 9A is compressed, as if by the weight of a rider or deflection over a bump. The full travel in this embodiment is about 8 inches as measured at the rearmost posterior edge of the seat assembly 68 relative to the ground. In a preferred embodiment, the height H2 of the seat above the ground when freestanding is more than 5 inches higher with the shock absorber fully extended than with the shock absorber fully compressed. In another preferred embodiment, the range of travel of the tail of the seat due to the suspension is 6 to 10 inches. In a particularly preferred embodiment, the range of travel is greater than 5 inches and less than 8 inches. With seated rider, the rearmost undersurface of the seat is about 15 to 26 inches from the ground, preferably about 18 to 20 inches from the ground, enabling the average rider to sit comfortably with feet fully on the snow. The suspension allows for travel above and below this point.

The extended travel serves two functions, first to facilitate loading and unloading of the skibob on a chairlift bench. A chairlift bench, by convention, is set at 18 inches above the snow on the chairlift platforms (loading and unloading), with a variability of plus or minus two inches. So the undersurface of the skibob seat may have to be raised up to 20 inches or slightly more during loading. The second function is comfort during downhill riding, where the deep suspension permits the rider to lower the seat to a level providing good foot contact with the snow.

Note that the travel is unusually long, in this example about 8 inches. This deep suspension provides a comfortable ride. However, as shown in this diagram, the rear suspension is also seen to be a rider-operable means for raising said planar underside surface of said seat member. As the rider removes or shifts weight off the rear suspension, the undercarriage readily recovers its lost travel and raises the seat, but does not eject the rider out of the seat because of the progressive rise rate. The rise rate can be adjusted by tuning the linkage or shock absorber. A combination of elements selected from extensible shock absorber, progressive shock absorber, spring, damper, gas cartridge, linkage mechanism, and swingarm, said swingarm further being characterized as a lever arm having a range of travel of greater than about 7 inches, are used to make the ride comfortable.

FIGS. 11A and 11B are exploded views of the rear ski mounting assembly, with rear ski 43, mounting block or "boot" 111, axle 112, swingarm 44, swingarm axle bracket or "dropout" 83, dampening plate assembly 110 with dampening plate 110a and dampening springs 110b. The adjustable dampening plate assembly limits play of the ski and helps true the ski tip for carving turns while skibobbing, functioning to control pitch attitude of the ski tips. The ski can also be removed for packing and transport, and optionally can be fitted with a modified "boot", "safety release", or "quick release" binding that secures the rear ski to the rear ski mounting adaptor. The rear ski can also be substituted by other mated device such as a skateboard or grass ski.

FIGS. 12A and 12B are exploded views of the front ski mounting assembly. Shown are the front ski 40, front forks 41, front ski axle 122, front ski mounting block or "boot" 121, and dampening block assembly 120 with clamshell dampening block members 120a and 120b and dampening springs 120c. The adjustable dampening block assembly limits play of the ski and helps true the ski tip for carving turns while skibobbing. The ski is removable. A "boot", "safety release", or "quick release" binding that secures the front ski to the front ski mounting adaptor is also contemplated. The front ski can also be substituted by other mated device such as a skateboard or grass ski.

The rigidity of the ski attachment, resulting from the use of dampening assemblies, increases the bite and sport performance of the skibob and keeps the ski tips riding upwards over deep or soft snow. Front and rear skis are made flexible to compensate for the structural rigidity of the mounting blocks of the front and rear axle assemblies. Both skis are relatively short, in some instances less than 100 cm each, and may be the size of children's skis.

Contrastingly, conventional skibobs are fitted so that the skis pivot on ski mounting axles, allowing the tips of the skis to pitch up and down. This conventional design is meant to allow the skis to stay in contact with the snow surface as the orientation of the snow surface undulates and changes with respect to the skibob while it is descending a ski slope, and has been demonstrated to make ski breakage less likely if rotational forces are applied to the skibob skis during a fall or extreme skiing maneuver. Unfortunately, when the skis are permitted to pitch on a center axle, the skibob will be less effective in applying the edge of the ski to the snow surface to control and steer the skibob. If a skibob ski is allowed to rotate on its own and adjust to changes in the snow surface, gravity and centrifugal forces involved in the skibob's turns, then physical forces pushing back against the ski from the snow surface while the skibob is in motion through a turn can force the ski to loose angulation and flatten both with respect to the snow surface and the downhill (fall line) direction.

Skibobs may have some means to dampen the ability of the ski to rotate, to limit the amount of rotation of the ski on the ski axle, and to true the alignment of the ski when the ski loses contact with the snow. Some manufacturers have used wound springs, others have used soft rubber bumpers. For example, the X-Bike mounting system uses springs to resist rotation of the ski (see FIG. 3 of U.S. Pat. No. 6,626,441), but has no stop chock to make sure that ski cannot simply continue to rotate against the relatively weak resistance of its spring. Other skibobs use rubber bumpers. There is typically about ¼ inch of free play before the ski contacts the surface of the rubber bumper, and the rubber bumper can compress, providing for about 2 inches of pitch pivot at the bumpers.

The skibob of the present invention adjustably eliminates the ability of the skibob skis to rotate up and down (ie. to pitch) at the center mounting pin 112,122 by use of dampening plates. Instead of the ski pivoting on a fixed axle when crossing undulations in the snow, compliance is distributed onto the front and rear suspension, the play in the mounting boots, and to the skis themselves, which flex. The performance of this combination mimics that of alpine skis rather than telemark skis. The dampening bolts and springs that reduce ski pitching motion, in combination with a full suspension undercarriage, creates a skibob which mimics the experience of downhill skiing by permitting the user to much more effectively hold and lever the ski edge into angulation against the fall line and snow surface very similar to the manner in which the downhill skier can lever the ski edge into the snow by pressing the shin into the cuff of the stiff ski boot. Angulation forces initiated by the user are transmitted with little dampening directly to the ski's edge—because the ski cannot rotate (pitch in attitude) away from the applied force. During tests of a mountain bike frame mounted with rigidly- versus pivotably-affixed skis, the performance difference between the old style skibob as described and the inventive embodiment without pitch in the skis was instantly apparent. This becomes important for physically challenged users, paradoxically but thankfully both reducing the relative skill needed for a beginner but also increasing performance with increasing skill.

On beginner and intermediate slopes, while wearing footskis, the rider can use their heels to exert control with no more strength than is necessary to push a wheeled office chair back from a desk on a smooth floor. The footskis are used for balance and braking and the handlebar and front ski are used for steering. On steeper expert slopes, the rate of descent of the skibob can no longer be controlled with heels alone. With the stiffer ski mounting, steering is almost as simple and easy as turning the skibob handlebars to point the downhill ski in the desired direction of travel and using the footskis for balance if needed. By making turns on a steeper slope, the speed of descent can be controlled, even by disabled persons.

Descent of the skibob can also be controlled by angulating with the skibob skis, and particularly the rear ski. Much like leaning a bicycle through a corner, the skibob can be leaned left or right to initiate this angulation. By regularly alternating between left and right leaning turns, linked ski turns can be accomplished on the skibob. Finally, to control the skibob, the skibobber can use a combination of steering with the handlebars and leaning the skibob to angulate the skibob skis against the fall line and the ski slope while using the footskis for balance.

Given the capability of the skibob to permit skiing by a relatively disabled or nonathletic individual, solving the problems of transporting the skibob and of loading and offloading the chairlift are thereby of great importance. Safe transport of the rider and skibob uphill and difficulty in getting on or off a 2-seat or 4-seat (quad) chairlift, for example, is a potential barrier in most venues that impedes access to this sport.

Figure 13A:
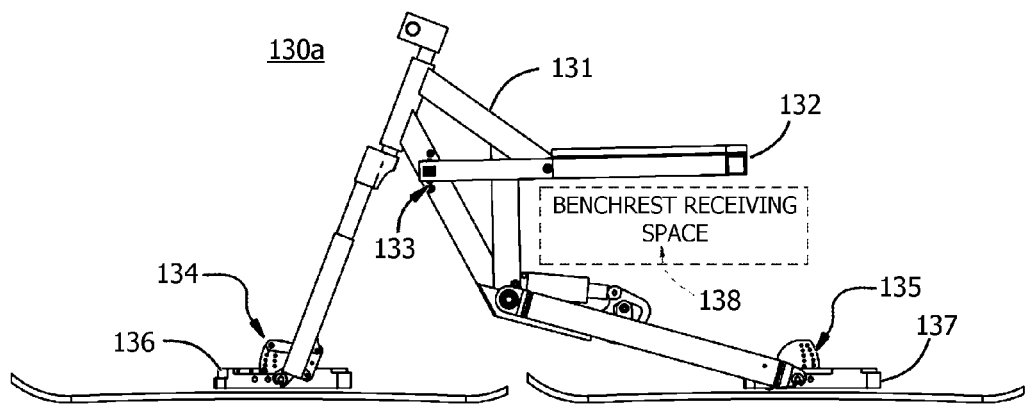
FIGS. 13A and 13B depict a first alternate embodiment with an adjustable seat height.
Figure 13B:
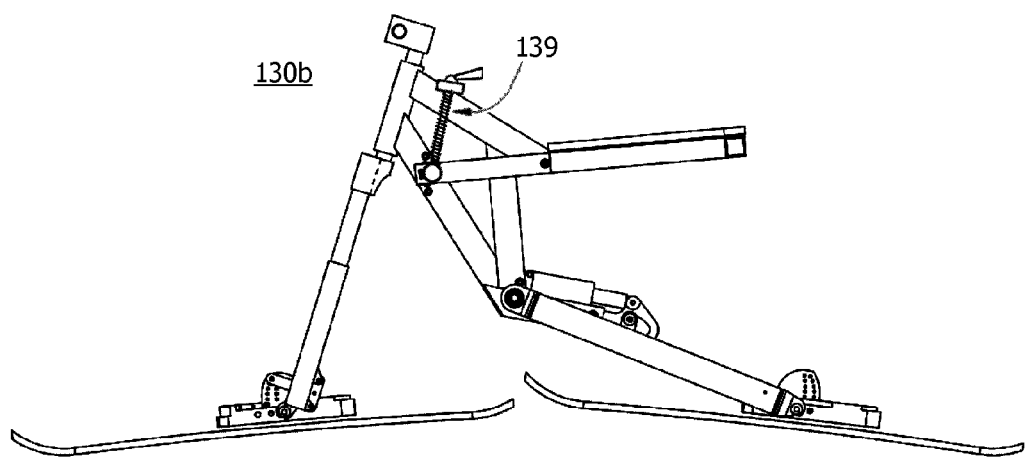

Other frame configurations are shown in FIGS. 13 and 14. In a first alternate embodiment (130a) of a skibob in FIG. 13A the frame is modified so that the top rail 131 of the frame supports the pendant seat member 132 at a fulcrum point and the anterior lever arms are pinned between posts 133 to prevent excessive movement. As before, the tail of the seat member is cantilevered posteriorly from the frame so as to create a receiving space 138 underneath the seat for receiving a benchrest of a chairlift. Also shown are modified dampening means 134,135 with tie bars for controlling play of the ski tips when mounted on the ski mounting assemblies 136,137. In a modified embodiment (130b) of FIG. 13B, a worm gear 139 and crank are depicted for raising or lowering the angle of the seat relative to the frame. Note also that the resting position of the ski tips can be adjusted so that the skibob stands on "its toes" when not weighted by a rider. This is useful in ensuring that the skibob will fall over when not mounted and cannot dangerously ski away on its own without a rider.

Figure 14A:
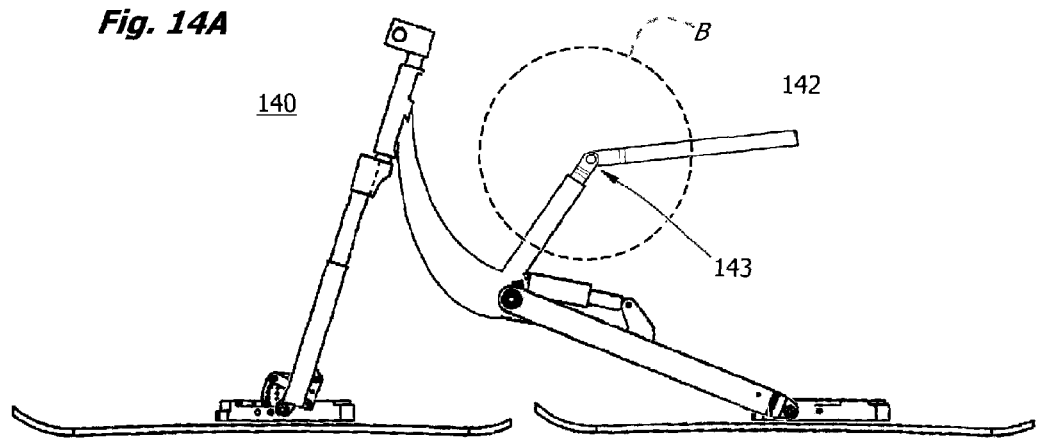
FIGS. 14A and 14B depict a second alternate embodiment of a genus.
Figure 14B:
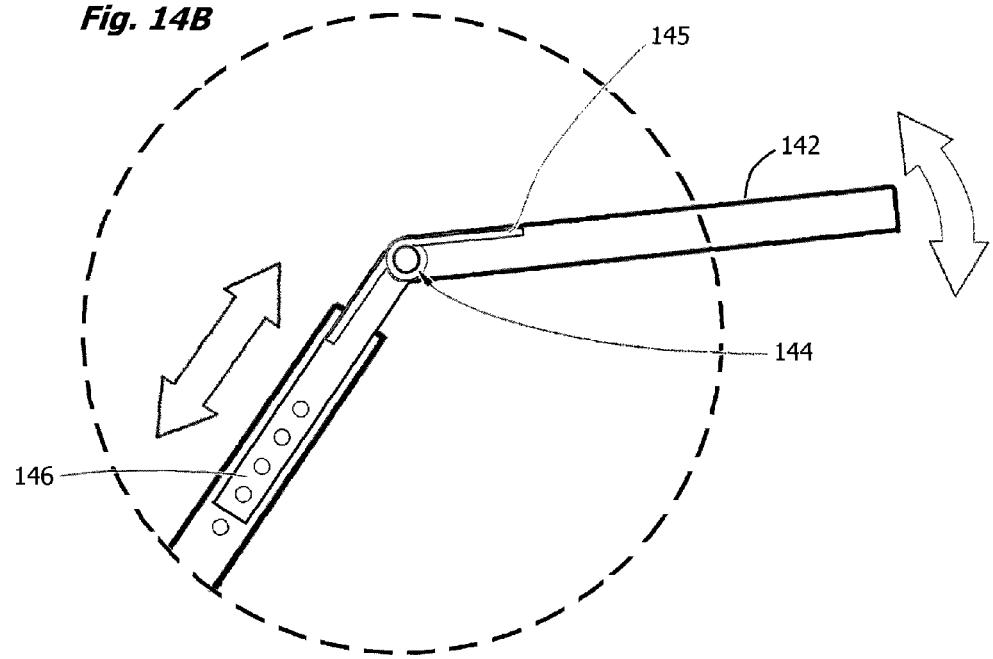

In FIG. 14A, an embodiment 140 is shown in which the frame is depicted without a top bar. The seat member 142 is attached to an upright element of the frame at hinge 143. A detail "B" of the hinge is shown in sectional view FIG. 14B. As viewed in vertical section, the pivot hardware of the seat hinge consists of a central axle 144 with stiff spring 145 wrapped around it. The spring wraps around the fulcrum and the forward prong of the spring serves as an anterior lever arm for biasing the height of the tail of the seat member. Chocks or tabs are used to set upper and lower ranges of motion on the movement of the seat member (curved double arrow). The stempost 146 also has an adjustable height (straight double arrow), and can be moved to accommodate the height of the ski lift benchrest at the loading platform.

Methods for assisted loading and offloading are now described in more detail. The rider begins by sitting on the seat of the skibob with hands on handlebars and feet on the snow. It is assumed that the rider is wearing footskis although a very advanced rider could ride with feet supported on elevated footrests mounted on the frame. The rider then skis onto a chairlift loading platform and orients the skibob with its rear aspect facing an oncoming chairlift bench. A disabled rider might need a push to get in position, or can use the footskis to line up on the chairlift loading platform. The chairlift loading platform is generally flat and the leading edge of the oncoming chairlift bench is typically about 18 inches above the snow on the platform and moving toward the rider. Leaning forward while straddling the skibob, the rider allows the rear suspension and seat pivot mechanism of the skibob to raise the seat so that the underside surface of the seat is higher than the level of the oncoming chairlift bench. The seat is designed with a clearance space under the seat large enough for receiving the chairlift bench. When the chairlift bench is fully under the seat, the rider sits down, leaning backwards, and the seat of the skibob comes to rest on top of the chairlift bench. The center of gravity of the skibob is designed so that the rider's weight on the seat stably and securely maintains the skibob in position on the chairlift bench. The rider then is carried on the chairlift up the slope to the offloading platform.

Generally the offloading platform includes a relatively level debarkment area of between 3 to about 10 feet in length and a downsloping exit ramp of about 6 ft in length, the exit ramp with sufficient slope so that only a small increment in momentum is required to accelerate away from the chairlift. To unload, the rider first uses the handlebars to keep the front ski pointed forward as it approaches the offloading platform. While airborne on the chairlift with no compression on the rear suspension of the skibob, the suspension will be fully extended and the swingarm with rear ski will be dangling below the chairlift, the forward tip of the rear ski pointing upward so as to easily clear the approaching foreslope of the offloading platform. When the rear ski firmly plants itself in the snow of the offloading platform, the spring effect of the suspension provides a boost up, shifting the rider's center of balance forward toward the handlebars and imparting forward momentum to the skibob. The rider "flows with the momentum", and is propelled off the benchrest. A rider with good balance can rest their feet on footrests on the frame while exiting the platform. Alternatively, the rider can balance or stand on footskis while astride the skibob, holding the handlebars, and is pushed along the offloading platform by the chairlift. As the cantilevered seat rises above the level of the chairlift bench, contact between the underside of the seat member and the upper surface of the benchrest is released. Then, as the chairlift, which never stops, clears the level portion of the offloading platform and the front ski begins to descend the unloading ramp, the rear of the skibob tilts even more upward relative to the benchrest, the rider will begin to accelerate ahead of the chairlift. Thanks to the elevation of the tail of the seat by the action of the spring elements and the downward slope of the exit ramp, the skibob will slide easily off the chairlift seat (even if full separation between the skibob seat and the chairlift seat is not achieved) just at the time needed. The combined process of elevation of the skibob seat by its suspension and the boosting of the rider's weight forward by the spring action (with which the rider can cooperate if able), forward momentum is added that assists in sliding the skibob off the bench (with the rider seated or standing astride the skibob) and down the exit ramp on the offloading platform. The rider continues to ski forward so as to exit the chairlift offloading platform while astride or mounted on the skibob. If necessary, a rider straddling the skibob and standing on footskis can push on the handlebars to dislodge the skibob from the bench of the chairlift, although generally this is not needed.

In another version of a method for assisted skibobbing, to load the inventive skibob onto the chairlift, the rider can straddle the skibob and wait in the loading area as the ski lift chair is arriving from behind. Spring means are used to raise rear seat undersurface, permitting the chairlift bench to enter the clearance space under the seat, and the rider then transfers full weight onto the seat of the skibob. In this maneuver, because of the travel and rising rate compression in the skibob's suspension, the forward-moving chairlift bench and the descending bottom of the skibob's seat will meet seamlessly and fluidly, as easily as falling backwards, scooping the rider up from the loading platform. The skibob rider ends up sitting on the seat of the skibob itself, which is resting directly on the seat of the ski lift chair. Because of the planar undersurface, lateral projections and contact surface area of the seat, the rider's perch is not precarious.

It should also be clear that during the loading maneuver, the rider may want to be able to compress the suspension sufficiently so that the rider's weight forces the chair into contact with the chairlift bench while the rear ski is still in contact with the snow. As the chairlift lifts off from the loading platform, the rear suspension will expand and the rear ski will drop to full extension. However, during loading, the rider may adjust the suspension so that seated weight is sufficient to drop the seat to a level that fully contacts the chairlift bench. This maneuver can be performed by straddling the skibob while standing on footskis so that the rider's weight is off the skibob. When the chairlift bench enters under the seat (under the rearwardly cantilevered arm of the seat member) and contacts the skibob frame, the rider has only to fall backward onto the seat in order to compress the soft suspension and transfer all weight onto the chairlift bench. Similarly, the rider can stand on the footskis as the chairlift enters the offloading platform, while straddling the skibob, and by leaning forward and pushing on the handlebars, push the skibob free of the chairlift, and then sit back down on the seat and ski away. Adjustments to the stiffness of the suspension and rise rate are made in the field as the rider gains confidence with the chairlift onloading and offloading maneuvers. A soft suspension serves to lower the rider onto the chairlift with ease.

Figure 15A:
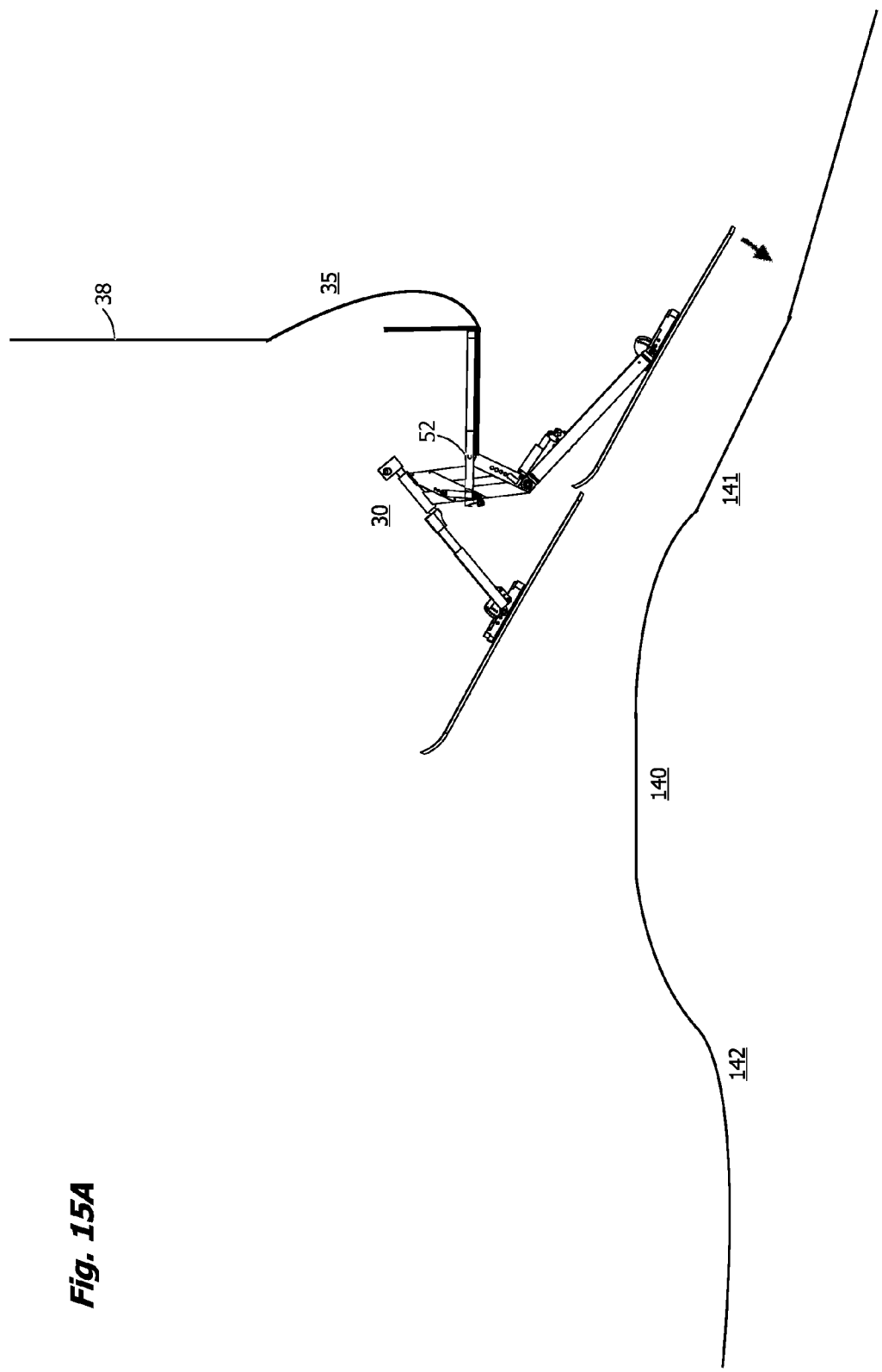
Figure 15B:
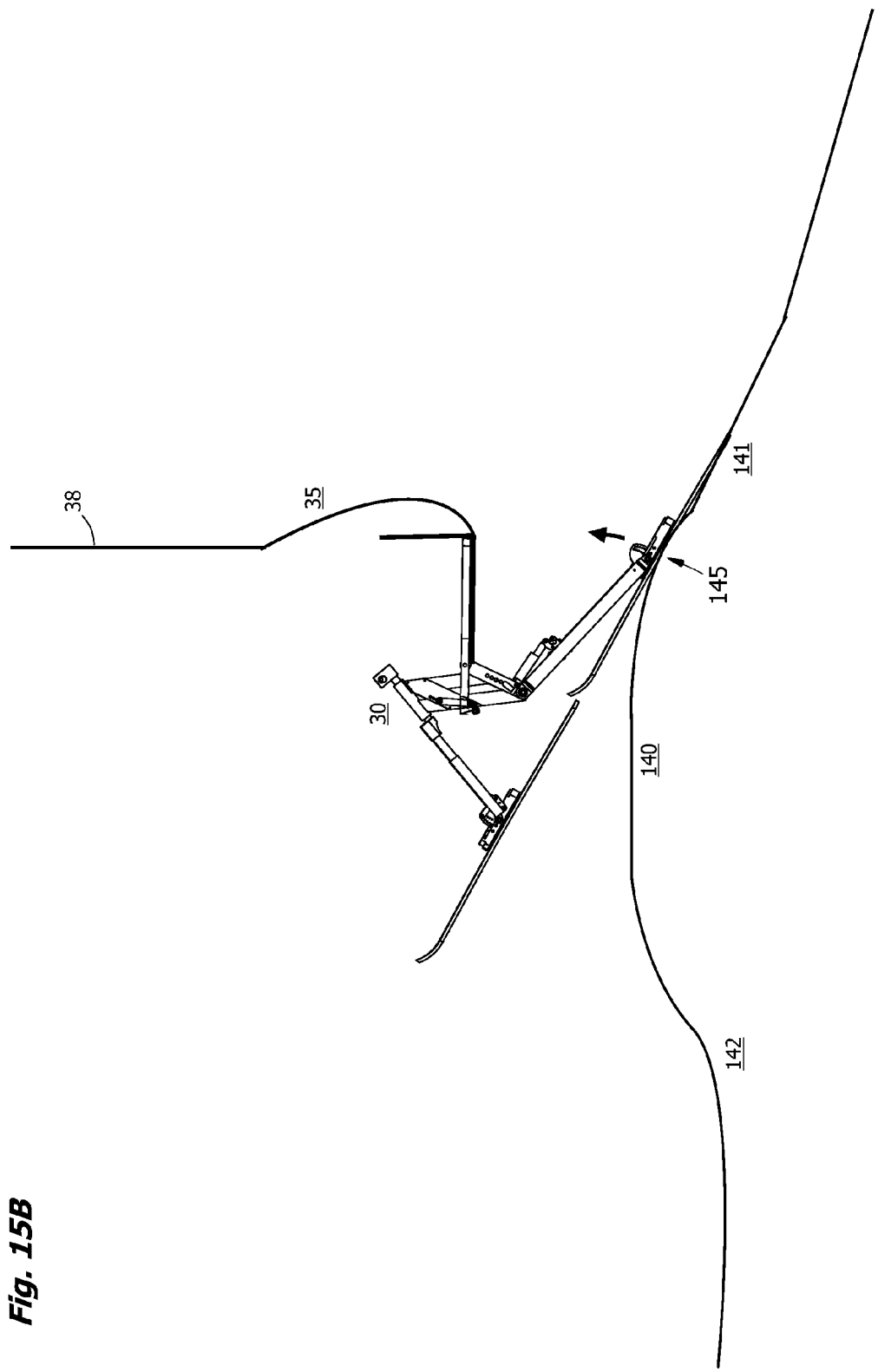
Figure 15D:
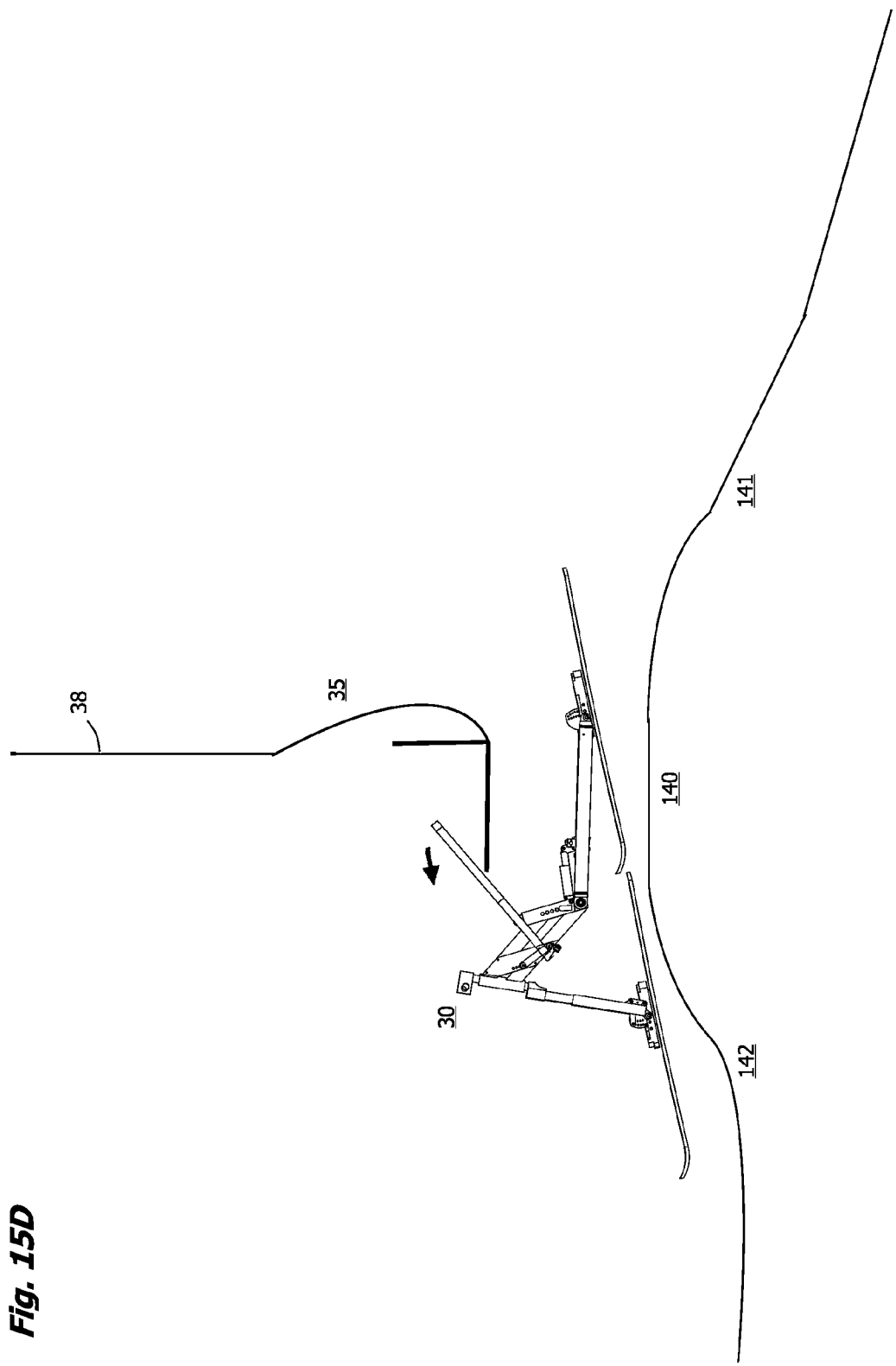
Figure 15E:
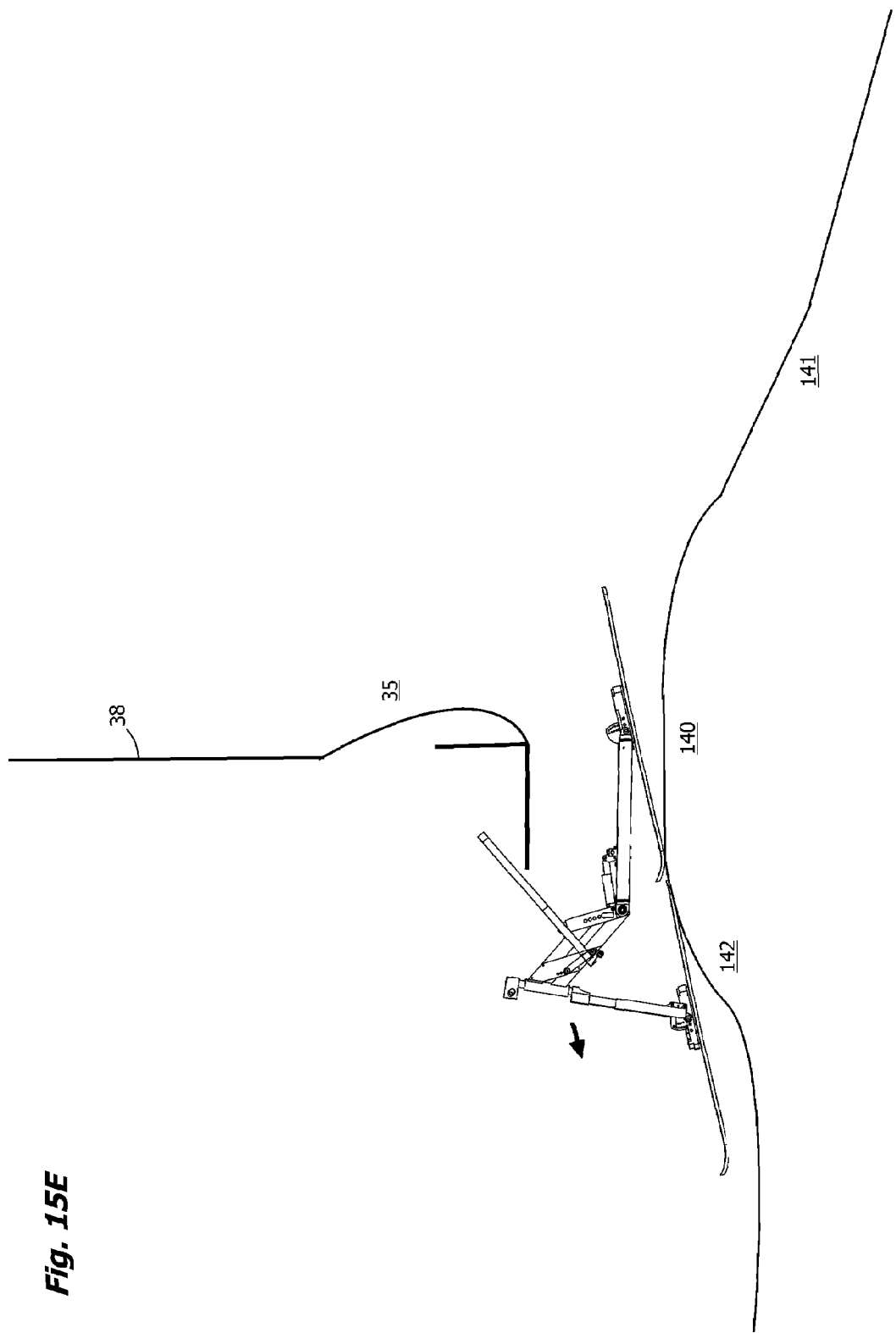
Figure 15F:
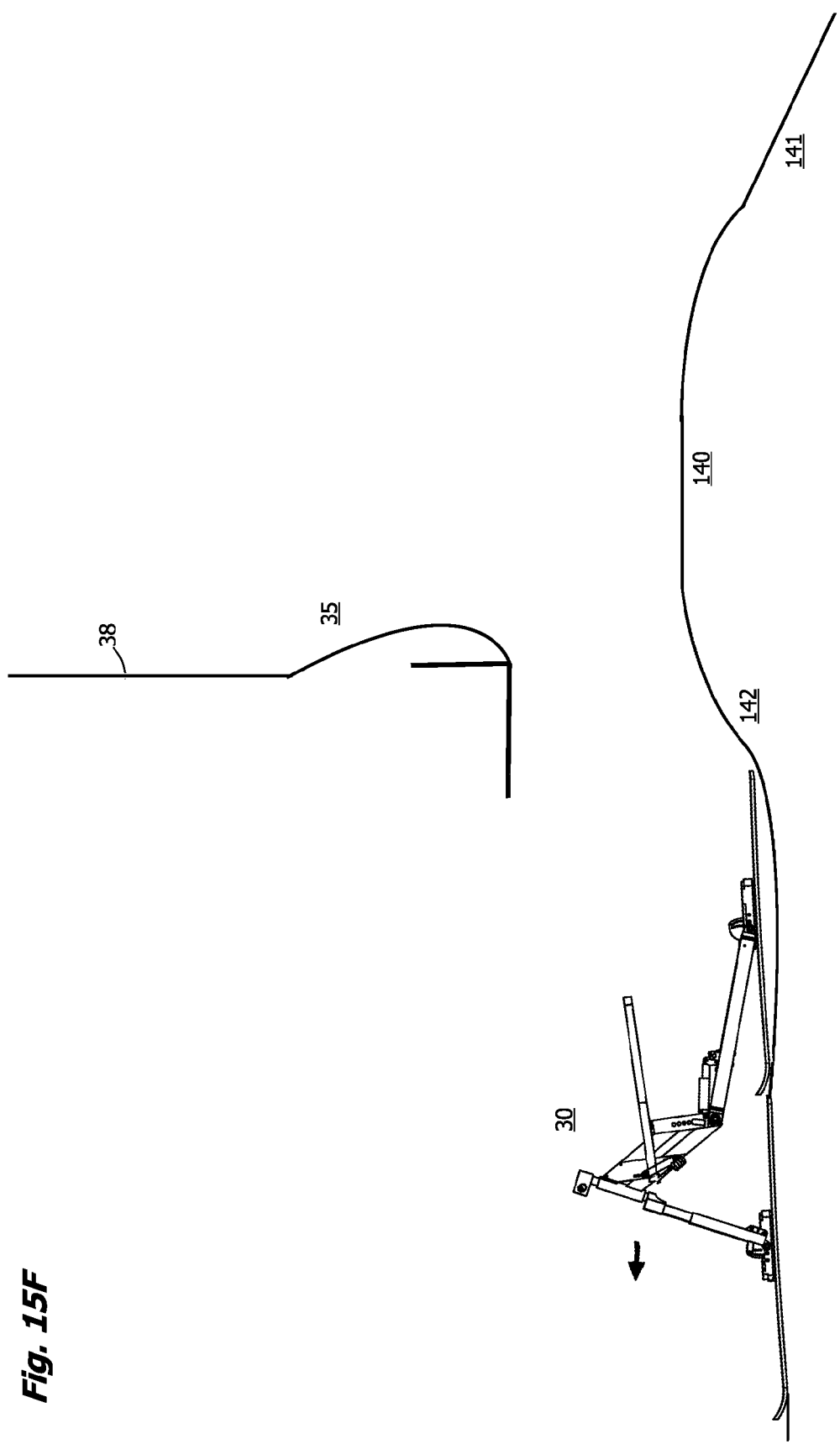

The unloading process is drawn schematically in FIGS. 15A-F. A rider is not depicted, but is assumed to be seated on the skibob with hands on the handlebars. A ski lift chair or "benchrest" 35 is suspended from a cable by suspension arms 38. In the six drawings, the chair is moving from right to left. A small snowcovered hillock 140 with ascending "foreslope" 141 and "exit ramp" 142 forms the unloading platform. In FIG. 15A, the swingarm and rear ski has dropped down, rotating clockwise (bold arrow) on pivot 52, during the transit, relaxing the spring means 57 (see FIGS. 3 and 4) of the anterior lever arms of the seat assembly and the rear suspension. The rear ski suspension is fully extended. In FIG. 15B, the rear ski makes contact with the leading edge of the unloading platform at 145 and plants itself in the snow. As the chairlift continues, the rear ski is pushed up toward the seat (bold arrow), rotating counterclockwise on pivot 52. In FIG. 15C, the chairlift continues to move to the left and the rear ski contacting the snow at 145 is rotating toward the seat. This counter-rotational upward thrust is operatively transferred to the spring means 57 in the seat assembly, storing energy in the springs (double arrow). The seat is biased to "tip" forward in response, although it is still held in place on the chairlift bench by the weight of the rider (not shown). The rider is preparing to slide off the benchrest. As the frame suspension and spring mechanism is compressed, the benchrest can become slowed relative to the forward motion of the cable and can tip forward slightly in response, aiding in gently dislodging the skibob. In FIG. 15D, the skibob is seen sliding off the chairlift benchrest. The tail of the seat rises (bold arrow) as the front ski begins to drop toward the exit ramp and the rider's weight is transferred off the benchrest. While not bound by one mechanism over another, as the front ski drops to follow the exit ramp, energy stored in the compression of the suspension is leveraged through the seat spring means onto the front fork, impelling the front ski downward onto the exit ramp. As the rear suspension extends (thanks to the design, there is no interference between the rear suspension and the benchrest), the seat of the rider is lifted above the height of the benchrest, so that the rider can accelerate off the benchrest substantially without resistance. Optionally, the spring biasing of the seat may be used to assist the rider forward and up on the seat, and the rider may also cooperate by leaning forward. In FIG. 15E, the skibob and rider have dismounted the bench and both skis are in contact with the snow. The skibob gains momentum (bold arrow) from this maneuver and the rider can ski ahead of the chairlift bench down the exit ramp from the offload platform. In FIG. 15F, the rider has skied ahead of the moving chairlift and is accelerating (bold arrow) down the exit ramp. The rider is now free to ride away and skibob down the ski slope. In this way, the entire cycle of riding the chairlift and skiing down the slope can be accomplished while the skibobber remains seated on the skibob. Synergically, the design brings together the complex motions of the skibob and the chairlift into a seamless unloading process that is flexible for lift conditions. If the height of the benchrest in relation to the offloading platform 140 is properly adjusted, the rider's trajectory can be so smoothly horizontal during offloading that the rider has only to balance on footskis or placing the feet on footrests during unloading, but will nonetheless accelerate ahead of the chairlift. The cycle of unloading, skibobbing and loading the chairlift for another ride can be repeated as many times as the rider desires without getting off the skibob. This is a significant advantage for persons with physical limitations, and opens recreational skibobbing to those who are disabled.

In comparison, the conventional method of riding requires that the skibobber either carry the skibob on their lap or disassemble the seat and upper frame and hang it from their arms. In either case, the unloading maneuver requires a skibob rider to stand up on the small, slippery footskis and immediately get out of the way of the moving chairlift. The skibobber must lift and carry or slide the skibob, and at no small risk of losing balance and falling, descend the unloading ramp, before remounting the skibob. Some skiers would chose not to use the footskis during these maneuvers because of the danger of loss of balance. The unloading maneuver is thus difficult even for persons with normal coordination and physical strength.

Similarly, to carry a snow bike of the type shown in U.S. Pat. Nos. 6,626,441 and 6,783,134, where the rider sits with feet on foot pegs, the rider must dismount the bike and carry it in their lap on the chairlift, then at the offloading platform, plant the skis on the platform, and either jump onto the foot pegs or run along while pushing the bike until clear of the lift. Riders using the device of U.S. Pat. No. 6,783,134 must also take the time to reassemble the seat in its upright position before continuing, a significant impediment for a disabled skier who may not be able to jump, run, stand and crouch to accomplish the steps of that process.

The loading and unloading method of the present invention assists the rider with these challenges. The cantilevered seat is one component of the design needed for the method of the invention. The cantilevered part of the seat member is 12 to 20 inches in length as measured from the rear of the seat to the supporting upright of the frame, preferably 16-18 inches in length. The travel and height of the seat must also be configured for the method. The skibob is therefore an apparatus for a method and both the adapted skibob and the steps of the method are needed to practice the invention.

An unexpected synergy was found when the seat and suspension were combined as disclosed here. The rear suspension, when compressed as the rear ski contacts the offloading platform, will temporarily store energy in the shock, which is then released as the rider leans forward to offload. When the rider transfers weight off the rear suspension, it extends, and by timing this so that the rider shifts their weight off the rear suspension at the top of the downsloping exit ramp, the rider can gain an excess of speed to ski down the ramp ahead of the chairlift. Only a small increment in transferred momentum is required to accelerate away from the chairlift. In this maneuver, having footskis actually helps, unlike the prior art described above.

The suspension components can readily be adjusted in the field to change the amount of compression which occurs for a specific mass, and the force and speed of return when the mass is released from the suspension by dismounting or while riding the device. A rider can use this energy to smoothly get off the chairlift bench and ski away down the offloading ramp.

When compressing the shock absorber during impact with the offloading platform, energy can be stored in one form and later released to the swingarm by extending the shock absorber or to the seat member by biasing the lever arm, thereby providing an active lift off the chairlift bench during offloading.

Further synergy was found by combining a lever arm associated with the seat and a spring means associated with the lever arm and the frame to further assist in the assisted unloading step. In this embodiment, the seat is attached at a fulcrum to the frame; the seat pivots on the fulcrum and is levered by a lever arm which is operatively connected to the spring means and the frame. The rider's weight opposes this spring biasing means so that when riding the skibob, the seat rests in a lower position relative to the frame. Then, when the rider is seated on the chairlift, the skibob is resting on the benchrest and the moving chairlift is in the air, and in this position, the frame drops down so as to relax the spring means. At the critical time, as the rear ski contacts the approaching foreslope of the unloading platform, and is thrust upwards by the ascending slope (because of the directional advance of the chairlift up the slope), the frame counter-rotates on the seat pivot axis 52 so as to operate on the spring means 57. In this way, the kinetic energy of the rotation of the frame is stored as potential energy in the spring, which can be an extension spring, a compression spring, or a helical spring, depending on the configuration of the lever arm. This potential energy in the spring can then be released to assist the rider in dismounting the bench by gently "catapulting" the rider's weight and momentum forward toward the handlebar over a specified range of motion. This momentum is thus redirected so that the skibob is impelled ahead and away from the moving chairlift. The rider triggers this coordinated movement by leaning forward, by rising slightly on foot skis, or by pushing on the handlebars while straddling the skibob. Once free of the chairlift bench, the rider easily rides down the exit ramp of the off loading platform without the need to dismount the skibob.

The spring means and suspension are both aspects of a means for assistedly dismounting a moving benchrest of a chairlift while remaining astride or seated on a skibob. One or the other, or both, may be configured to assist in performing this maneuver.

In one embodiment the invention is a skibob for assisting a rider in riding and dismounting a moving benchrest of a chairlift, which comprises: a frame and having an anterior aspect with a front ski attached on a front ski mounting member, a posterior aspect with a rear ski attached on a rear ski mounting member and a supraposterior fulcrum point on the frame for attaching a seat member; the seat member having a lever arm and a rearwardly cantilevered arm with a seat at its rearmost tail for seating a rider, wherein the fulcrum of the frame attaches between the lever arm and the rearwardly cantilevered arm, the lever arm having a range of motion between a first position wherein the seat is raised in relation to the frame and a second position wherein the seat is lowered in relation to the frame; further wherein said rearwardly cantilevered arm is provided with a generally planar underside surface and a contiguous benchrest receiving space under the rearwardly cantilevered arm for receiving said moving benchrest of said chairlift supportingly thereinunder, whereby the chairlift transports the skibob while the rider is seated on the seat; and a spring biasing means operatively connected to the lever arm and the frame, wherein the spring means is configured for assistedly raising the seat with rider to the first position when "operated upon" by the counterrotation of the frame at the fulcrum in relation to the seat when the rear ski up-thrustingly is elevated by contact with an ascending foreslope of an offloading platform of the chairlift.

In practice, these skibobs are used in methods whereby the seat of the skibob is supportedly, stably and securely held in place between the buttocks of the rider and the benchrest while riding on a chairlift. The method also comprises a step for assistedly dismounting the moving chairlift while remaining astride the seat of the skibob. A pivot between the frame and the seat member is generally provided so that the rear ski hangs downward while the rider is on the chairlift. When the rear ski encounters the ascending slope of an offloading platform at the top of the ski lift, the frame is counter-rotated on the pivot axis and the center of gravity of the skibob shifts forward. By incorporating spring means into the rear suspension and undercarriage, or by incorporating a spring means between the frame and a lever arm connected to the seat member, or both, the energy of the collision between the rear ski and the offloading platform can be stored and provides a "boost up" to assist the rider in dismounting from the chairlift bench.

In another embodiment, the invention is a skibob for riding a chairlift while seated on the skibob, which comprises: a frame with an anterior aspect for attaching a front ski mounting member and front ski and a posterior aspect for attaching a rear ski mounting member and rear ski; a seat member with a rearwardly cantilevered arm with seat at its rearmost tail for seating the rider, wherein the rearwardly cantilevered arm is joined to a supraposterior aspect of the frame and is provided with a generally planar underside surface and an underside benchrest receiving space contiguous under the underside surface for receiving the benchrest of said moving chairlift supportingly thereinunder, whereby the benchrest apposingly supports the skibob on the chairlift while the rider is seated on the seat.

In a preferred embodiment the method is a method for promoting winter sports for riders with physical limitations, which comprises riding (or providing for use by a rider) a skibob with frame having an anterior aspect with a front ski attached on a front ski mounting member, a posterior aspect with a rear ski attached on a rear ski mounting member, and a supraposterior fulcrum point for attaching a seat member; the seat member having a lever arm and a rearwardly cantilevered arm with a seat at rearmost end for seating a rider, wherein the fulcrum of the frame attaches between the lever arm and the rearwardly cantilevered arm, the lever arm having a range of motion between a first position wherein the seat is raised in relation to the frame and a second position wherein the seat is lowered in relation to the frame; further wherein the rearwardly cantilevered arm is provided with a generally planar underside surface and a contiguous benchrest receiving space under the underside surface for receiving the moving benchrest of the chairlift supportingly thereinunder, whereby the chairlift transports the skibob while the rider is seated on the seat; and optionally, a means for assistedly dismounting the benchrest of the moving chairlift while remaining astride the skibob. The methods further comprise the steps of: when entering a chairlift loading platform, riding on the seat and orienting the skibob so that the posterior aspect is facing toward an oncoming benchrest of the chairlift; receiving the oncoming benchrest into the underside benchrest receiving space and contacting the planar underside surface of the rearwardly cantilevered arm with an upper surface of the benchrest; and remaining stably seated on the seat when the benchrest supportingly lifts the skibob from the loading platform. Optionally, the steps include: when entering a chairlift loading platform, riding on the seat and orienting the skibob so that the posterior aspect is facing toward an oncoming benchrest of the chairlift; springedly biasing the rearwardly cantilevered arm to the first position of the lever arm, thereby pivotingly raising the seat; receiving the oncoming benchrest into the underside benchrest receiving space and contacting the planar underside surface of the rearwardly cantilevered arm with an upper surface of the benchrest; and remaining stably seated on the seat when the benchrest supportingly lifts the skibob from the loading platform. To offload, the method may include simply: when approaching a chairlift offloading platform, pointing the front ski in the direction of travel; and when the rear ski is thrust up by contact with the offloading platform, sliding forward off the benchrest and skiing away from the offloading platform. Optionally, offloading may include the steps of: when approaching a chairlift offloading platform, pointing the front ski in the direction of travel; and when the rear ski firmly contacts the snow of the offloading platform, standing on footskis while straddling the skibob and skiing away from the offloading platform.

In another embodiment, a method for conveying and transporting the skibob and rider on a moving chairlift is disclosed, the skibob of the method having a frame with anterior aspect for attaching a front ski, a posterior aspect for attaching a rear ski, and a seat member for the rider, wherein the seat member is rearwardly cantilevered at a pivot axis on a supraposterior aspect of the frame, may comprise a step for riding on a benchrest of the moving chairlift with the seat supportedly and stably held in place between the buttocks of the rider and the benchrest. This method may also comprise a step for assistedly dismounting the moving chairlift while remaining astride the seat of the skibob, which comprises: configuring a spring means with spring force sufficient for assistedly "tipping the seat forward or upward" when operated on by a rotation of the frame at the pivot axis, the rotation of the frame resulting from contact of the rear ski with the ascending foreslope of the offloading platform of the skilift.

Alternatively, a method is disclosed for promoting skibobbing for physically limited riders of need of a means for riding a chairlift bench without unseating from the skibob. The method comprises providing a skibob having a rearwardly extended seat member with substantially planar underside surface and a swingarm with rear suspension, wherein said skibob seat member and swingarm with rear suspension are configured for raising said seat member higher than a chairlift bench without unseating from the seat of the skibob, and a benchrest receiving space between the underside of the seat member and the upper surfaces of the swingarm and rear suspension, the benchrest receiving space having dimensions proportioned for receiving a chairlift bench into an inferior position supportingly contacting the underside surface of the seat or seat assembly.

In summary, the invention is in one sense a family of methods and in another sense a family of apparatuses for performing those methods. While the above is a description of one or more embodiments of the present invention most currently favored, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

EXAMPLE 1

A skibob of the design of FIG. 2 was fabricated and tested. As built, the shock travel is about 2.5 inches; the total suspension travel is 7.8 inches. The average leverage ratio is 3.1, but varies with the travel and has a progressive rise rate. The swingarm length L2=22.4 inches (from the pivot attachment to the frame to the rear ski attachment axle or pivot) and the seat cantilever length L1=17.1 inches (the distance from the seat member fulcrum to the tail of the seat). The following specifications are given:

Frame: 6061 Aluminum alloy hollow 2" square tubing,
Frame Construction: TIG Welded,
Front Fork: Rock Shox Tora 350 with 85 to 130 mm travel and rebound adjustments,
Rear Suspension: Fox Racing Shox DHX AIR 50 with rebound, bottom out and sag adjustments,
Ski attachment: angle adjustable, solid mounted, nylon composite, form permits any short ski with standard ski binding to be attached,
Ride height: varies from 16 inches to 24 inches unloaded.

The following performance characteristics were noted:

1. The front fork travel adjustment is easily operated in the field, and not only changes the suspension performance by providing a stiffer ride when shorter travel is selected, but also lowers the ride height of the skibob by as much as two inches.
2. Total suspension travel is about 8 inches measured at the tail of the seat.
3. The angle of the front and rear skis is adjustable tip up and down, and once each skis angle is selected, mounting dampening hardware prohibits the ski from rotating excessively while the skibob is being ridden on snow. Instead the flex of the front and rear skis, and the front and rear suspension components, permits the skibob to respond fluidly to the snow surface, while forcefully holding the edges of the front and rear skis into carved turns. This unique design causes the skibob to easily and immediately carve precise and effective ski turns simply by leaning to either side while in motion (similar to leaning a bicycle while going around a corner), and prohibits the skibob when not weighted by a rider from runaway skiing on its own because the canted front and rear skis destabilize the unweighted skibob.
4. Transport of a mounted rider on a chairlift bench was safely and comfortably accomplished.
5. Loading and offloading a physically handicapped rider on a chairlift while seated or straddling the skibob was safely and comfortably accomplished. During offloading, depending on the height of the offloading platform, essentially effortless disengagement of the seat of the skibob from the chairlift bench was observed; the skibob readily accelerated ahead of the chairlift and exited the offloading platform without the need to rise from the seat. In less optimal offloading platform heights, a pull on the handlebars was often sufficient to cause the skibob to slide off the chairlift bench and accelerate ahead of the moving bench. The rider, if able, had the option of straddling the skibob on footskis while dismounting.
6. Riders with limits in physical capacity were readily able to ski down a slope on the skibob with no prior experience and minimal instruction.

All of the U.S. patents, U.S. patent application publications, U.S. patent applications, foreign patents, foreign patent applications and non-patent publications referred to in this specification and/or listed in the Information Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the specifics of the disclosure.

We claim:

1. A skibob for riding a benchrest of a moving chairlift while the rider is seated on the seat of the skibob, which comprises:
    a) a frame having an anterior aspect for attaching a front ski by a front ski mounting member, a posterior aspect for attaching a rear ski by a rear ski mounting member;
    b) a seat member rearwardly cantilevered from a supraposterior aspect of said frame, wherein said seat member comprises a rearwardly cantilevered cantilever arm and a seat posteriorly disposed thereon for seating the rider;
    c) wherein said cantilever arm is provided with a generally planar underside surface defining a contiguous benchrest receiving space under said underside surface for receiving said moving benchrest of said chairlift supportingly thereunder;
    d) further wherein said rear ski mounting member comprises a swingarm descendingly angled posteriorly from said frame, said swingarm pivotingly connecting at a first end to an axle (P) of the frame and at a second end to said rear ski; and
    e) a means for assistedly dismounting from said benchrest of said moving chairlift while remaining astride said skibob; wherein said means for assistedly dismounting from said benchrest comprises a rear suspension having a mechanical linkage and a shock absorber, said shock absorber pivotingly connecting at a first nose to said mechanical linkage and at a second nose to said frame; said mechanical linkage operating with said swingarm by compressingly storing energy in said shock absorber when said swingarm is upthrustingly elevated upward in relation to said frame by contact with an ascending foreslope of an offloading platform of the chairlift and decompressingly releasing energy from said shock absorber by a reciprocating downward rotation of said swingarm as said seat member slides off of said benchrest.

2. The skibob of claim 1, wherein
    a) said supraposterior aspect of said frame for attaching said seat member comprises a supraposterior fulcrum point configured for pivoting said rearwardly cantilevered cantilever arm attached thereto over a range of travel between a first position wherein said seat is raised in relation to said frame and a second position wherein said seat is lowered in relation to said frame;
    b) said seat member further comprises a lever arm forwardly projecting from said cantilever arm at said fulcrum point, such that said lever arm and said cantilever arm pivot in unison on said fulcrum point; and
    c) said means for assistedly dismounting from said benchrest of said chairlift further comprises a spring means operatively biasing said lever arm in relation to said frame, wherein said spring means is configured for assistedly raising the seat with rider to an elevated position when operated upon by the counter-rotation of the frame at the fulcrum in relation to the seat when the rear ski up-thrustingly is elevated by contact with an ascending foreslope of an offloading platform of the chairlift, said spring means operating in concert with said mechanical linkage to transfer energy from said rear ski to said pivotable seat member.

3. The skibob of claim 2, wherein said spring means is configured so as to be adjustable for the weight of the rider and further wherein said frame comprises one or more restraining bumpers or chocks for controlling the range of travel of the seat member from the first position to the second position.

4. The skibob of claim 1, wherein
a) said supraposterior aspect of said frame for attaching said seat member comprises a supraposterior fulcrum point configured for pivoting said rearwardly cantilevered cantilever arm attached thereto over a range of travel between a first position wherein said seat is raised in relation to said frame and a second position wherein said seat is lowered in relation to said frame; and
b) said means for assistedly dismounting from said benchrest of said chairlift further comprises a torsion spring means operatively mounted between said frame and said cantilever arm at said fulcrum, and said spring means is configured for assistedly raising the seat with rider to an elevated position when operated upon by the counter-rotation of the frame at the fulcrum in relation to the seat when the rear ski up-thrustingly is elevated by contact with an ascending foreslope of an offloading platform of the chairlift, said spring operating in concert with said mechanical linkage to transfer energy from said rear ski to said pivotable seat member.

5. The skibob of claim 1, wherein said benchrest receiving space is proportionately dimensioned so as to supportingly fit said benchrest of said chairlift under said rearwardly cantilevered cantilever arm of the seat member, and wherein said seat has a upper surface area proportionately dimensioned to accommodate the surface area of the human buttocks.

6. The skibob of claim 1, wherein said generally planar underside surface of said cantilever arm is defined by rail segments of said seat member, said rail segments for slidingly dismounting off from said benchrest, and optionally wherein said seat height is adjustable.

7. The skibob of claim 1, wherein said mechanical linkage is a Chebyshev linkage having a low-profile, crossed-trapezoidal, four-bar linkage mechanism configured to convert travel of said swingarm as it reciprocates over a range of arc into compression and decompression of said shock absorber.

8. The skibob of claim 7, wherein said Chebyshev linkage is configured with an input link formed by said swingarm, a follower link, a ground link, and a coupler link, wherein said coupler link is in tension between said follower link and said input link, and further wherein said follower link is modified with a wing arm extending as a lever from said linkage mechanism to an excentric pivot, said excentric pivot with coupling pin for attaching said wing arm to said first nose of said shock absorber with coupler link in tension, and wherein said shock absorber is a progressive shock absorber.

9. The skibob of claim 7, wherein said shock absorber is a progressive shock absorber, and optionally wherein said progressive shock absorber is adjustable.

10. The skibob of claim 1, wherein said front ski mounting member comprises a front suspension, and wherein said front ski mounting member and front ski further comprises a dampening means for controlling the pitch attitude of said front ski.

11. The skibob of claim 1, wherein said rear ski mounting member and rear ski comprises a dampening means for controlling the pitch attitude of said rear ski.

* * * * *